(12) United States Patent
Von Hatten

(10) Patent No.: US 10,906,044 B2
(45) Date of Patent: Feb. 2, 2021

(54) METHODS OF IMPROVING DROPLET OPERATIONS IN FLUIDIC SYSTEMS WITH A FILLER FLUID INCLUDING A SURFACE REGENERATIVE SILANE

(71) Applicant: Illumina Cambridge Limited, Cambridge (GB)

(72) Inventor: Xavier Von Hatten, Cambridge (GB)

(73) Assignee: ILLUMINA CAMBRIDGE LIMITED, Cambridge (GB)

( * ) Notice: Subject to any disclaimer, the term of this patent is extended or adjusted under 35 U.S.C. 154(b) by 167 days.

(21) Appl. No.: 15/746,390

(22) PCT Filed: Aug. 31, 2016

(86) PCT No.: PCT/EP2016/070448
§ 371 (c)(1),
(2) Date: Jan. 19, 2018

(87) PCT Pub. No.: WO2017/037078
PCT Pub. Date: Mar. 9, 2017

(65) Prior Publication Data
US 2018/0193840 A1    Jul. 12, 2018

Related U.S. Application Data

(60) Provisional application No. 62/213,352, filed on Sep. 2, 2015.

(51) Int. Cl.
*B01L 3/00* (2006.01)
*C08L 33/26* (2006.01)
(Continued)

(52) U.S. Cl.
CPC ........ *B01L 3/502792* (2013.01); *C08L 33/26* (2013.01); *C08L 83/08* (2013.01);
(Continued)

(58) Field of Classification Search
CPC .. B01L 3/00; C08L 33/26; C08L 83/08; C08L 83/14
(Continued)

(56) References Cited

U.S. PATENT DOCUMENTS

| 5,130,238 A | 7/1992 | Malek et al. |
| 5,455,166 A | 10/1995 | Walker |

(Continued)

FOREIGN PATENT DOCUMENTS

| CN | 102065823 | 5/2008 |
| CN | 101237934 | 8/2008 |

(Continued)

OTHER PUBLICATIONS

Viskanic, M., Authorized Officer, European Patent Office, International Search Report, International Application No. PCT/EP2016/070448, dated Nov. 18, 2006, 2 pages.
(Continued)

*Primary Examiner* — Arlen Soderquist
(74) *Attorney, Agent, or Firm* — Illumina, Inc.

(57) ABSTRACT

Embodiments of present application are directed to micro fluidic devices and particularly digital micro fluidic devices with improved droplet operations, and methods of improving droplet operations in micro fluidic devices.

12 Claims, 14 Drawing Sheets

(51) Int. Cl.
*C08L 83/08* (2006.01)
*C08L 83/14* (2006.01)

(52) U.S. Cl.
CPC ....... *C08L 83/14* (2013.01); *B01L 2300/0816* (2013.01); *B01L 2300/165* (2013.01); *B01L 2400/04* (2013.01); *B01L 2400/0418* (2013.01); *B01L 2400/0421* (2013.01); *B01L 2400/0424* (2013.01); *B01L 2400/0427* (2013.01)

(58) Field of Classification Search
USPC ........................................................ 422/504
See application file for complete search history.

(56) References Cited

U.S. PATENT DOCUMENTS

| | | | |
|---|---|---|---|
| 5,599,675 A | 2/1997 | Brenner | |
| 5,641,658 A | 6/1997 | Adams et al. | |
| 5,750,341 A | 5/1998 | Macevicz | |
| 6,210,891 B1 | 4/2001 | Nyren et al. | |
| 6,214,587 B1 | 4/2001 | Dattagupta et al. | |
| 6,258,568 B1 | 7/2001 | Nyren | |
| 6,274,320 B1 | 8/2001 | Rothberg et al. | |
| 6,355,431 B1 | 3/2002 | Chee et al. | |
| 6,565,727 B1 | 5/2003 | Shenderov | |
| 6,773,566 B2 | 8/2004 | Shenderov et al. | |
| 6,890,741 B2 | 5/2005 | Fan et al. | |
| 6,911,132 B2 | 6/2005 | Pamula et al. | |
| 6,913,884 B2 | 7/2005 | Stuelpnagel et al. | |
| 6,977,033 B2 | 12/2005 | Becker et al. | |
| 7,052,244 B2 | 5/2006 | Fouillet et al. | |
| 7,057,026 B2 | 6/2006 | Barnes et al. | |
| 7,115,400 B1 | 10/2006 | Adessi et al. | |
| 7,163,612 B2 | 1/2007 | Sterling et al. | |
| 7,211,414 B2 | 5/2007 | Hardin et al. | |
| 7,244,559 B2 | 7/2007 | Rothberg et al. | |
| 7,315,019 B2 | 1/2008 | Turner et al. | |
| 7,328,979 B2 | 2/2008 | Decre et al. | |
| 7,329,492 B2 | 2/2008 | Hardin et al. | |
| 7,405,281 B2 | 7/2008 | Xu et al. | |
| 7,547,380 B2 | 6/2009 | Velev | |
| 7,582,420 B2 | 9/2009 | Oliphant et al. | |
| 7,595,883 B1 | 9/2009 | El Gamal et al. | |
| 7,641,779 B2 | 1/2010 | Becker et al. | |
| 7,727,466 B2 | 6/2010 | Meathrel et al. | |
| 8,968,459 B1* | 3/2015 | Liu | C09D 183/04 106/13 |
| 2002/0055100 A1 | 5/2002 | Kawashima et al. | |
| 2003/0205632 A1 | 11/2003 | Kim et al. | |
| 2004/0002090 A1 | 1/2004 | Mayer et al. | |
| 2004/0038423 A1 | 2/2004 | Smirnov et al. | |
| 2004/0096853 A1 | 5/2004 | Mayer | |
| 2005/0053980 A1 | 3/2005 | Gunderson et al. | |
| 2005/0064202 A1* | 3/2005 | Graham | C09D 133/16 428/423.1 |
| 2005/0064460 A1 | 3/2005 | Holliger et al. | |
| 2005/0084612 A1 | 4/2005 | Yang et al. | |
| 2005/0130173 A1 | 6/2005 | Leamon et al. | |
| 2005/0179746 A1 | 8/2005 | Roux et al. | |
| 2005/0181440 A1 | 8/2005 | Chee et al. | |
| 2005/0191698 A1 | 9/2005 | Chee et al. | |
| 2006/0039823 A1 | 2/2006 | Yamakawa et al. | |
| 2006/0164490 A1 | 7/2006 | Kim et al. | |
| 2006/0194331 A1 | 8/2006 | Pamula et al. | |
| 2007/0023292 A1 | 2/2007 | Kim et al. | |
| 2007/0099208 A1 | 5/2007 | Drmanac et al. | |
| 2007/0128624 A1 | 6/2007 | Gormley et al. | |
| 2008/0009420 A1 | 1/2008 | Schroth et al. | |
| 2008/0023330 A1* | 1/2008 | Viovy | B01F 13/0071 204/450 |
| 2008/0100905 A1* | 5/2008 | Kato | G02B 3/14 359/295 |
| 2008/0108082 A1 | 5/2008 | Rank et al. | |
| 2008/0124252 A1 | 5/2008 | Marchand et al. | |
| 2008/0283414 A1 | 11/2008 | Monroe et al. | |
| 2009/0026082 A1 | 1/2009 | Rothberg et al. | |
| 2009/0127589 A1 | 5/2009 | Rothberg et al. | |
| 2009/0142853 A1* | 6/2009 | Warrington | B01L 3/502776 436/172 |
| 2009/0186349 A1 | 7/2009 | Gunderson et al. | |
| 2009/0192044 A1 | 7/2009 | Fouillet | |
| 2009/0280251 A1 | 11/2009 | Guzman et al. | |
| 2009/0283407 A1 | 11/2009 | Shah et al. | |
| 2009/0321262 A1 | 12/2009 | Adachi et al. | |
| 2010/0096266 A1 | 4/2010 | Kim et al. | |
| 2010/0137143 A1 | 6/2010 | Rothberg et al. | |
| 2010/0172799 A1 | 7/2010 | Roeper et al. | |
| 2010/0194408 A1 | 8/2010 | Sturmer et al. | |
| 2010/0279066 A1* | 11/2010 | Bulliard | B82Y 30/00 428/141 |
| 2010/0282617 A1 | 11/2010 | Rothberg et al. | |
| 2010/0285573 A1* | 11/2010 | Leck | B01L 3/5088 435/288.4 |
| 2011/0048951 A1 | 3/2011 | Wu | |
| 2011/0059556 A1 | 3/2011 | Strey et al. | |
| 2011/0070180 A1 | 3/2011 | Ranade et al. | |
| 2011/0118132 A1 | 5/2011 | Winger et al. | |
| 2011/0143964 A1* | 6/2011 | Zhou | B01L 3/5027 506/26 |
| 2012/0009662 A1 | 1/2012 | Shen et al. | |
| 2013/0134039 A1 | 5/2013 | Bjornson et al. | |
| 2015/0075991 A1 | 3/2015 | Delattre et al. | |
| 2015/0079290 A1* | 3/2015 | Yang | B01J 13/18 427/331 |
| 2015/0239773 A1* | 8/2015 | Aytug | C23C 14/5873 428/312.6 |
| 2015/0283541 A1 | 10/2015 | Curran | |
| 2015/0340219 A1* | 11/2015 | Mellors | H01J 49/0445 250/288 |
| 2016/0274272 A1* | 9/2016 | Sjong | C03C 25/104 |

FOREIGN PATENT DOCUMENTS

| | | |
|---|---|---|
| CN | 101778712 | 7/2010 |
| CN | 102119056 | 7/2011 |
| CN | 104066512 | 9/2014 |
| CN | 104174445 | 12/2014 |
| CN | 104603595 | 5/2015 |
| CN | 104812492 | 7/2015 |
| WO | 1989/010977 | 11/1989 |
| WO | 1991/006678 | 5/1991 |
| WO | 2004/018497 | 3/2004 |
| WO | 2005/010145 | 2/2005 |
| WO | 2007/120241 | 10/2007 |
| WO | 2007/123744 | 11/2007 |
| WO | 2008/042067 | 4/2008 |
| WO | 2008/098236 | 8/2008 |
| WO | 2008/106678 | 9/2008 |
| WO | 2009/021173 | 2/2009 |
| WO | 2010/027894 | 3/2010 |
| WO | 2011002957 A2 | 1/2011 |
| WO | 2012/058096 | 5/2012 |
| WO | 2013/117595 | 8/2013 |
| WO | 2013/131962 | 9/2013 |

OTHER PUBLICATIONS

Bains, et al., "A novel method for nucleic acid sequence determination", J. Theor Biol., 135(3), 1988, 303-307.

Bentley, et al., "Accurate whole human genome sequencing using reversible terminator chemistry", Nature, vol. 456, Nov. 2008, 53-59.

Dean, et al., "Comprehensive human genome amplification using multiple displacement amplification", Proc. Natl. Acad. Sci. USA 99, 2002, 5261-5266.

Dhindsa, et al., "Virtual Electrowetting Channels: Electronic Liquid Transport with Continuous Channel Functionality", Lab on a Chip, vol. 10, 2010, 832-836.

Dressman, et al., "Transforming single DNA molecules into fluorescent magnetic particles for detection and enumeration of genetic variations", Proc. Natl. Acad. Sci. USA 100 (15), 2003, 8817-8822.

(56) References Cited

OTHER PUBLICATIONS

Drmanac, et al., "Accurate sequencing by hybridization for DNA diagnostics and individual genomics", Nature Biotechnology, 16(1), 1998, 54-58.

Fodor, et al., "Light-Directed, Spatially Addressable Parallel Chemical Synthesis", Science, vol. 251, 1991, 767-773.

Korlach, et al., "Selective aluminum passivation for targeted immobilization of single DNA polymerase molecules in zero-mode waveguide nanostructures", PNAS, vol. 105 No. 4, 2008, 1176-1181.

Lage, et al., "Whole genome analysis of genetic alterations in small DNA samples using hyperbranched strand displacement amplification and array-CGH", Genome Res., 13(2), 2003, 294-307.

Levene, et al., "Zero-Mode Waveguides for Single-Molecule Analysis at high concentrations", Science 299, 2003, 682-686.

Lizardi, "Mutation detection and single-molecule counting using isothermal rolling-circle amplification", Nature Genetics, vol. 19, 1998, 225-232.

Lundquist, et al., "Parallel confocal detection of single molecules in real time", Opt. Lett. 33(9), 2008, 1026-1028.

Ronaghi, et al., "A Sequencing Method Based on Real-Time Pyrophosphate", Science 281 (5375), 1998, 363-365.

Ronaghi, et al., "Real-time DNA sequencing using detection of pyrophosphate release", Anal. Biochem. Nov. 1, 1996; 242 (1):84-9, 242 (1), 1996, 84-89.

Ronaghi, "Pyrosequencing sheds light on DNA sequencing", Genome Res, 11(1), 2001, 3-11.

Shendure, et al., "Accurate Multiplex Polony Sequencing of an Evolved Bacterial Genome", Science, 309(5741), 2005, 1728-1732.

Walker, et al., "A Chemiluminescent DNA Probe Test Based on Strand Displacement Amplification", Molecular Methods for Virus Detection, 1995, Academic Press Inc. Ch 15 pp 329-349, 1995, 329-349.

Walker, et al., "Strand displacement amplification—an isothermal, in vitro DNA amplification technique", Nucleic Acids Res., 20, 1992, 1691-1696.

\* cited by examiner

METHODS OF IMPROVING DROPLET OPERATIONS IN FLUIDIC SYSTEMS WITH A FILLER FLUID INCLUDING A SURFACE REGENERATIVE SILANE

INCORPORATION BY REFERENCE TO PRIORITY APPLICATION

The present application is a 35 U.S.C. § 371 National Stage application of PCT Application No. PCT/EP2016/070448, filed on Apr. 11, 2013, which claims the benefit of priority to U.S. Provisional Patent Application No. 62/213,352, filed Sep. 2, 2015; each of which aforementioned applications is hereby expressly incorporated by reference in its entirety.

FIELD

In general, the present application is in the field of fluidic devices and particularly digital microfluidic devices, including methods of improving droplet operations, sample analysis, devices life-span and robustness.

BACKGROUND

Microfluidic devices are miniature fluidic devices dealing with small fluidic volumes, usually in the sub-milliliter range. Microfluidic devices typically have micromechanical structures (microchannels, microtracks, micropaths, microvalves and others) and employ various fluid-moving mechanisms, such as mechanical parts (e.g., micropumps) hydropneumatic devices/methods and electrically-based effects (electrophoretic, dielectrophoretic, electro-osmotic, electrowetting, opto-electrowetting, and variations of these effects as well as other effects).

For biomedical applications, some microfluidic devices are designed to conduct sample processing, including concentration, filtration, washing, dispensing, mixing, transport, sample splitting, sample lysing and other sample handling functions. Some microfluidic devices are designed to conduct DNA or protein sample preparation and sequencing reactions on a biological sample.

Exemplary microfluidic devices of the present application include electrowetting devices that have a top plate, usually made of plastic or glass, which is coated with a conductive coating layer and a hydrophobic layer and a printed circuit board (PCB) on the bottom with tracks or paths of electrodes in between, a dielectric coating and a hydrophobic layer such as the droplet operation happen in between the top plate and the PCB, in contact with both hydrophobic layers. The space between the two hydrophobic layers can be filled with a filler fluid which is immiscible with the sample or reagent droplets. In some instances, the microfluidic device includes a sequencing region, which contains both hydrophilic and hydrophobic surfaces. During fluidic device operation, the hydrophobic layers or surface are in contact with an etchant such as sequencing-by-synthesis reagents, which may cause hydrolysis or depletion of the hydrophobic coating at elevated temperatures or when contacted for prolonged period of time. This can result in the droplets having difficulty in moving through the fluidic device. In some cases, the loss of hydrophobicity of the hydrophobic surface results in the permanent pinning of the droplets to the surface and catastrophic failure of the device.

SUMMARY

Some embodiments of the present application are directed to a method for improving droplet operation in a microfluidic device, comprising contacting a hydrophobic surface of the microfluidic device with a filler fluid comprising a surface regenerative molecule, wherein the contacting regenerates hydrophobicity of the hydrophobic surface. In some embodiments, the surface regenerative molecule also hinders diffusion of droplets through the hydrophobic surface. In some embodiments, the method further comprises mixing the surface regenerative molecule with the filler fluid of the microfluidic device. In some embodiments, the surface regenerative molecule is in constant contact with the hydrophobic surface.

Some embodiments of the present application are directed to a microfluidic device with improved droplet operations, having a hydrophobic surface, a droplet actuator, and a filler fluid, wherein the filler fluid contains a surface regenerative molecule that is capable of regenerating hydrophobicity of the hydrophobic surface of the micro fluidic device. In some embodiments, the surface regenerative molecule also hinders diffusion of droplets through the hydrophobic surface. In some embodiments, the microfluidic device is a digital microfluidic device. In some embodiments, the digital microfluidic device employs an electrowetting mechanism.

Some embodiments of the present application are directed to a system comprising a micro fluidic device described herein coupled to and controlled by a computer processor.

DETAILED DESCRIPTION OF THE EMBODIMENTS

Figure 1:
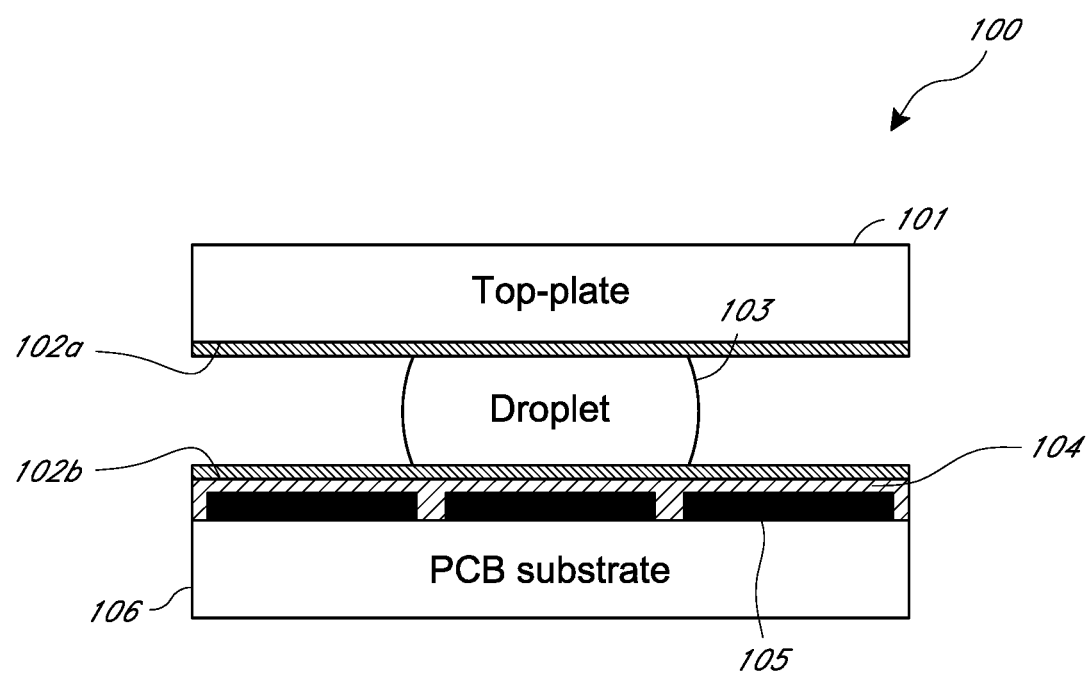
FIG. 1 is a cross-section view of an embodiment of a digital microfluidic cartridge.

The present disclosure relates to methods for improving droplet operations and robustness of microfluidic devices, particularly for digital micro fluidic devices that are designed to improve droplet operation during sample processing and analysis.

Exemplary microfluidic devices of the present application include digital fluidic cartridges comprising a top plate, usually made of plastic, which is coated with a conductive coating layer, two hydrophobic layers with tracks or paths of electrode in between, a dielectric coating and a printed circuit board (PCB) bottom. The space between the two hydrophobic layers can be filled with a filler fluid which is immiscible with the sample or reagent droplets. In some instances, the microfluidic device further includes a patterned sequencing region, containing hydrophilic nanoscale features (such as nanowells) and hydrophobic interstitial surface area. During fluidic device operation, the hydrophobic surface of the microfluidic device is in contact with an etchant such as sequencing-by-synthesis reagents, which may cause the hydrolysis or depletion of the hydrophobic coating at elevated temperatures for a prolonged period of time, resulting in increasing difficulty in the mobility of the droplets. In some embodiments, the hydrophobic coating layer of the microfluidic device comprises a fluoropolymer CYTOP. The CYTOP coated surface is quite porous, which may result in "electrosoaking" through a combination of the electrowetting and capillary forces, causing some water in the droplets to penetrate into the CYTOP matrix during electrowetting. When electrosoaking occurs, it reduces the contact angle of the CYTPO coating. After repeated electrowetting runs, the droplet might migrate all the way through the CYTOP coating to the electrodes of the PCB, resulting in electrolysis of the droplets. In addition, some electric current might also leak through the CYTOP surface and result in electrolysis of the droplets.

Embodiments of the present application therefore include methods to regenerate the hydrophobicity of the hydrophobic surface during droplet operations by incorporating a surface regenerative molecule in the filler fluid. In one embodiment, the surface regenerative molecule comprises a fluorinated silane derivative. In another embodiment, the surface regenerative molecule comprises a silane derivative. The surface regenerative molecule has the ability to interact with the hydrophobic surface of the micro fluidic device to heal or fix the defects in the hydrophobic coating resulted from the etching of the reagents, for example, cleavage mixing for sequencing (CMS) reagents.

The following detailed description is directed to certain specific embodiments of the present application. In this description, reference is made to the drawings wherein like parts or steps may be designated with like numerals throughout for clarity. Reference in this specification to "one embodiment," "an embodiment," or "in some embodiments" means that a particular feature, structure, or characteristic described in connection with the embodiment can be included in at least one embodiment of the invention. The appearances of the phrases "one embodiment," "an embodiment," or "in some embodiments" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The section headings used herein are for organizational purposes only and are not to be construed as limiting the subject matter described.

Definitions

Unless defined otherwise, all technical and scientific terms used herein have the same meaning as is commonly understood by one of ordinary skill in the art. The use of the term "including" as well as other forms, such as "include", "includes," and "included," is not limiting. The use of the term "having" as well as other forms, such as "have", "has," and "had," is not limiting. As used in this specification, whether in a transitional phrase or in the body of the claim, the terms "comprise(s)" and "comprising" are to be interpreted as having an open-ended meaning. That is, the above terms are to be interpreted synonymously with the phrases "having at least" or "including at least." For example, when used in the context of a process, the term "comprising" means that the process includes at least the recited steps, but may include additional steps. When used in the context of a compound, composition, or device, the term "comprising" means that the compound, composition, or device includes at least the recited features or components, but may also include additional features or components.

As used herein, common abbreviations are defined as follows:

ACA Advancing contact angle
CA Contact angle
CAH Contact angle hysteresis
CMS Cleavage mixing for sequencing
CVD Chemical vapor deposition
DF Digital fluidic
DMS Dimethylsiloxane
EW Electrowetting
ITO Indium tin oxide
PAZAM poly(N-(5-azidoacetamidylpentyl) acrylamide-co-acrylamide) of any acrylamide to Azapa (N-(5-(2-azidoacetamido)pentyl)acrylamide) ratio
PCB Printed circuit board
PDMS Poly(dimethyl)siloxane
PECVD Plasma-enhanced chemical vapor deposition
PCR Polymerase chain reaction
PDMS Polydimethylsiloxane
FOTMS 1H,1H,2H,2H-Perfluorooctyltrimethoxysilane
RCA Receding contact angle
SBS Sequencing-by-synthesis
SHP Semi-HydroPhobic
ssDNA Single stranded DNA
THP Tris(-3hydroxypropyl)phosphine As used herein, the term "droplet" means a volume of liquid on a droplet actuator. Typically, a droplet is at least partially bounded by a filler fluid. For example, a droplet may be completely surrounded by a filler fluid or may be bounded by filler fluid and one or more surfaces of the droplet actuator. As another example, a droplet may be bounded by filler fluid, one or more surfaces of the droplet actuator, and/or the atmosphere. As yet another example, a droplet may be bounded by filler fluid and the atmosphere. Droplets may, for example, be aqueous or non-aqueous or may be mixtures or emulsions including aqueous and non-aqueous components. Droplets may contain solid particles such as magnetic beads. Droplets may take a wide variety of shapes; non-limiting examples include generally disc shaped, slug shaped, truncated sphere, ellipsoid, spherical, partially compressed sphere, hemispherical, ovoid, cylindrical, combinations of such shapes, and various shapes formed during droplet operations, such as merging or splitting or formed as a result of contact of such shapes with one or more surfaces of a droplet actuator. For examples of droplet fluids that may be subjected to droplet operations using the approach of the present disclosure, see Eckhardt et al., International Patent Pub. No. WO/2007/120241, entitled, "Droplet-Based Biochemistry," published on Oct. 25, 2007, the entire disclosure of which is incorporated herein by reference. In some embodiments, a droplet is an aqueous droplet.

In various embodiments, a droplet may include a biological sample, such as whole blood, lymphatic fluid, serum, plasma, sweat, tear, saliva, sputum, cerebrospinal fluid, amniotic fluid, seminal fluid, vaginal excretion, serous fluid, synovial fluid, pericardial fluid, peritoneal fluid, pleural fluid, transudates, exudates, cystic fluid, bile, urine, gastric fluid, intestinal fluid, fecal samples, liquids containing single or multiple cells, liquids containing organelles, fluidized tissues, fluidized organisms, liquids containing multi-celled organisms, biological swabs and biological washes. Moreover, a droplet may include a reagent, such as water, deionized water, saline solutions, acidic solutions, basic solutions, detergent solutions and/or buffers. A droplet can include proteins or enzymes. A droplet can include nucleic acids, such as DNA, genomic DNA, RNA, mRNA or analogs thereof; nucleotides such as deoxyribonucleotides, ribonucleotides or analogs thereof such as analogs having terminator moieties such as those described in Bentley et al., *Nature* 456:53-59 (2008); Gormley et al., International Patent Pub. No. WO/2013/131962, entitled, "Improved Methods of Nucleic Acid Sequencing," published on Sep. 12, 2013; Barnes et al., U.S. Pat. No. 7,057,026, entitled "Labelled Nucleotides," issued on Jun. 6, 2006; Kozlov et al., International Patent Pub. No. WO/2008/042067, entitled, "Compositions and Methods for Nucleotide Sequencing," published on Apr. 10, 2008; Rigatti et al., International Patent Pub. No. WO/2013/117595, entitled, "Targeted Enrichment and Amplification of Nucleic Acids on a Support," published on Aug. 15, 2013; Hardin et al., U.S. Pat. No. 7,329,492, entitled "Methods for Real-Time Single Molecule Sequence Fetermination," issued on Feb. 12, 2008; Hardin et al., U.S. Pat. No. 7,211,414, entitled "Enzymatic Nucleic Acid Synthesis: Compositions and Methods for Altering Monomer Incorporation Fidelity," issued on May 1, 2007; Turner et al., U.S. Pat. No. 7,315,019, entitled "Arrays of Optical Confinements and Uses Thereof," issued on Jan. 1, 2008; Xu et al., U.S. Pat. No. 7,405,281, entitled "Fluorescent Nucleotide Analogs and Uses Therefor," issued on Jul. 29, 2008; and Rank et. al.., U.S. Patent Pub. No. 20080108082, entitled "Polymerase Enzymes and Reagents for Enhanced Nucleic Acid Sequencing," published on May 8, 2008, the entire disclosures of which are incorporated herein by reference; enzymes such as polymerases, ligases, recombinases, or transposases; binding partners such as antibodies, epitopes, streptavidin, avidin, biotin, lectins or carbohydrates; or other biochemically active molecules. Other examples of droplet contents include reagents, such as a reagent for a biochemical protocol, such as a nucleic acid amplification protocol, an affinity-based assay protocol, an enzymatic assay protocol, a sequencing protocol, and/or a protocol for analyses of biological fluids. A droplet may include one or more beads.

As used herein, the term "droplet actuator" means a device for manipulating droplets. For examples of droplet actuators, see Pamula et al., U.S. Pat. No. 6,911,132, entitled "Apparatus for Manipulating Droplets by Electrowetting-Based Techniques," issued on Jun. 28, 2005; Pamula et al., U.S. Patent Pub. No. 20060194331, entitled "Apparatuses and Methods for Manipulating Droplets on a Printed Circuit Board," published on Aug. 31, 2006; Pollack et al., International Patent Pub. No. WO/2007/120241, entitled "Droplet-Based Biochemistry," published on Oct. 25, 2007; Shenderov, U.S. Pat. No. 6,773,566, entitled "Electrostatic Actuators for Microfluidics and Methods for Using Same," issued on Aug. 10, 2004; Shenderov, U.S. Pat. No. 6,565,727, entitled "Actuators for Microfluidics Without Moving Parts," issued on May 20, 2003; Kim et al., U.S. Patent Pub. No. 20030205632, entitled "Electrowetting-driven Micropumping," published on Nov. 6, 2003; Kim et al., U.S. Patent Pub. No. 20060164490, entitled "Method and Apparatus for Promoting the Complete Transfer of Liquid Drops from a Nozzle," published on Jul. 27, 2006; Kim et al., U.S. Patent Pub. No. 20070023292, entitled "Small Object Moving on Printed Circuit Board," published on Feb. 1, 2007; Shah et al., U.S. Patent Pub. No. 20090283407, entitled "Method for Using Magnetic Particles in Droplet Microfluidics," published on Nov. 19, 2009; Kim et al., U.S. Patent Pub. No. 20100096266, entitled "Method and Apparatus for Real-time Feedback Control of Electrical Manipulation of Droplets on Chip," published on Apr. 22, 2010; Velev, U.S. Pat. No. 7,547,380, entitled "Droplet Transportation Devices and Methods Having a Fluid Surface," issued on Jun. 16, 2009; Sterling et al., U.S. Pat. No. 7,163,612, entitled "Method, Apparatus and Article for Microfluidic Control via Electrowetting, for Chemical, Biochemical and Biological Assays and the Like," issued on Jan. 16, 2007; Becker et al., U.S. Pat. No. 7,641,779, entitled "Method and Apparatus for Programmable Fluidic Processing," issued on Jan. 5, 2010; Becker et al., U.S. Pat. No. 6,977,033, entitled "Method and Apparatus for Programmable Fluidic Processing," issued on Dec. 20, 2005; Decre et al., U.S. Pat. No. 7,328,979, entitled "System for Manipulation of a Body of Fluid," issued on Feb. 12, 2008; Yamakawa et al., U.S. Patent Pub. No. 20060039823, entitled "Chemical Analysis Apparatus," published on Feb. 23, 2006; Wu, U.S. Patent Pub. No. 20110048951, entitled "Digital Microfluidics Based Apparatus for Heat-exchanging Chemical Processes," published on Mar. 3, 2011; Fouillet et al., U.S. Patent Pub. No. 20090192044, entitled "Electrode Addressing Method," published on Jul. 30, 2009; Fouillet et al., U.S. Pat. No. 7,052,244, entitled "Device for Displacement of Small Liquid Volumes Along a Micro-catenary Line by Electrostatic Forces," issued on May 30, 2006; Marchand et al., U.S. Patent Pub. No. 20080124252, entitled "Droplet Microreactor," published on May 29, 2008; Adachi et al., U.S. Patent Pub. No. 20090321262, entitled "Liquid Transfer Device," published on Dec. 31, 2009; Roux et al., U.S. Patent Pub. No. 20050179746, entitled "Device for Controlling the Displacement of a Drop Between Two or Several Solid Substrates," published on Aug. 18, 2005; and Dhindsa et al., "Virtual Electrowetting Channels: Electronic Liquid Transport with Continuous Channel Functionality," Lab Chip, 10:832-836 (2010). The disclosure of each of the references is incorporated herein by reference in its entirety.

Certain droplet actuators will include one or more substrates arranged with a droplet operations gap therebetween and electrodes associated with (e.g., layered on, attached to, and/or embedded in) the one or more substrates and arranged to conduct one or more droplet operations. For example, certain droplet actuators will include a base (or bottom) substrate, droplet operations electrodes associated with the substrate, one or more dielectric layers atop the substrate and/or electrodes, and optionally one or more hydrophobic layers atop the substrate, dielectric layers and/or the electrodes forming a droplet operations surface. A top substrate may also be provided, which is separated from the droplet operations surface by a gap, commonly referred to as a droplet operations gap. Various electrode arrangements on the top and/or bottom substrates are discussed in the above-referenced patents and applications and certain novel electrode arrangements are discussed in the description of the present disclosure. During droplet operations it is preferred that droplets remain in continuous contact or frequent contact with a ground or reference electrode. A ground or reference electrode may be associated with the top substrate facing the gap, the bottom substrate facing the gap, in the gap. Where electrodes are provided on both substrates, electrical contacts for coupling the electrodes to a droplet actuator instrument for controlling or monitoring the electrodes may be associated with one or both plates. In some cases, electrodes on one substrate are electrically coupled to the other substrate so that only one substrate is in contact with the droplet actuator. In one embodiment, a conductive material (e.g., an epoxy, such as MASTER BOND™ Polymer System EP79, available from Master Bond, Inc., Hackensack, N.J.) provides the electrical connection between electrodes on one substrate and electrical paths on the other substrates, e.g., a ground electrode on a top substrate may be coupled to an electrical path on a bottom substrate by such a conductive material. Where multiple substrates are used, a spacer may be provided between the substrates to determine the height of the gap therebetween and define on-actuator dispensing reservoirs. The spacer height may, for example, be at least about 5 µm, 100 µm, 200 µm, 250 µm, 275 µm or more. Alternatively or additionally the spacer height may be at most about 600 µm, 400 µm, 350 µm, 300 µm, or less. The spacer may, for example, be formed of a layer of projections form the top or bottom substrates, and/or a material inserted between the top and bottom substrates. One or more openings may be provided in the one or more substrates for forming a fluid path through which liquid may be delivered into the droplet operations gap. The one or more openings may in some cases be aligned for interaction with one or more electrodes, e.g., aligned such that liquid flowed through the opening will come into sufficient proximity with one or more droplet operations electrodes to permit a droplet operation to be effected by the droplet operations electrodes using the liquid. The base (or bottom) and top substrates may in some cases be formed as one integral component. One or more reference electrodes may be provided on the base (or bottom) and/or top substrates and/or in the gap. Examples of reference electrode arrangements are provided in the above referenced patents and patent applications.

In various embodiments, the manipulation of droplets by a droplet actuator may be electrode mediated, e.g., electrowetting mediated or dielectrophoresis mediated or Coulombic force mediated. Examples of other techniques for controlling droplet operations that may be used in the droplet actuators of the present disclosure include using devices that induce hydrodynamic fluidic pressure, such as those that operate on the basis of mechanical principles (e.g. external syringe pumps, pneumatic membrane pumps, vibrating membrane pumps, vacuum devices, centrifugal forces, piezoelectric/ultrasonic pumps and acoustic forces); electrical or magnetic principles (e.g. electroosmotic flow, electrokinetic pumps, ferrofluidic plugs, electrohydrodynamic pumps, attraction or repulsion using magnetic forces and magnetohydrodynamic pumps); thermodynamic principles (e.g. gas bubble generation/phase-change-induced volume expansion); other kinds of surface-wetting principles (e.g. electrowetting, and optoelectrowetting, as well as chemically, thermally, structurally and radioactively induced surface-tension gradients); gravity; surface tension (e.g., capillary action); electrostatic forces (e.g., electroosmotic flow); centrifugal flow (substrate disposed on a compact disc and rotated); magnetic forces (e.g., oscillating ions causes flow); magnetohydrodynamic forces; and vacuum or pressure differential. In certain embodiments, combinations of two or more of the foregoing techniques may be employed to conduct a droplet operation in a droplet actuator of the present disclosure. Similarly, one or more of the foregoing may be used to deliver liquid into a droplet operations gap, e.g., from a reservoir in another device or from an external reservoir of the droplet actuator (e.g., a reservoir associated with a droplet actuator substrate and a flow path from the reservoir into the droplet operations gap). Droplet operations surfaces of certain droplet actuators of the present disclosure may be made from hydrophobic materials or may be coated or treated to make them hydrophobic. For example, in some cases some portion or all of the droplet operations surfaces may be derivatized with low surface-energy materials or chemistries, e.g., by deposition or using in situ synthesis using compounds such as poly- or per-fluorinated compounds in solution or polymerizable monomers. Examples include TEFLON® AF (available from DuPont, Wilmington, Del.), members of the CYTOP family of materials, coatings in the FLUOROPEL® family of hydrophobic and superhydrophobic coatings (available from Cytonix Corporation, Beltsville, Md.), silane coatings, fluorosilane coatings, hydrophobic phosphonate derivatives (e.g., those sold by Aculon, Inc), and NOVEC™ electronic coatings (available from 3M Company, St. Paul, Minn.), other fluorinated monomers for plasma-enhanced chemical vapor deposition (PECVD), and organosiloxane (e.g., SiOC) for PECVD.

In some cases, the droplet operations surface may include a hydrophobic coating having a thickness ranging from about 10 nm to about 1,000 nm. Moreover, in some embodiments, the top substrate of the droplet actuator includes an electrically conducting organic polymer, which is then coated with a hydrophobic coating or otherwise treated to make the droplet operations surface hydrophobic. For example, the electrically conducting organic polymer that is deposited onto a plastic substrate may be poly(3,4-ethylenedioxythiophene) poly(styrenesulfonate) (PEDOT:PSS). Other examples of electrically conducting organic polymers and alternative conductive layers are described in Pollack et al., International Patent Pub. No. WO/2011/002957, entitled "Droplet Actuator Devices and Methods," published on Jan. 6, 2011, the entire disclosure of which is incorporated herein by reference.

One or both substrates may be fabricated using a printed circuit board (PCB), glass, indium tin oxide (ITO)-coated glass, and/or semiconductor materials as the substrate. When the substrate is ITO-coated glass, the ITO coating is preferably a thickness of at least about 20 nm, 50 nm, 75 nm, 100 nm or more. Alternatively or additionally the thickness can be at most about 200 nm, 150 nm, 125 nm or less. In some cases, the top and/or bottom substrate includes a PCB substrate that is coated with a dielectric, such as a polyimide dielectric, which may in some cases also be coated or otherwise treated to make the droplet operations surface hydrophobic. When the substrate includes a PCB, the following materials are examples of suitable materials: MITSUI™ BN-300 (available from MITSUI Chemicals America, Inc., San Jose Calif.); ARLON™ 11N (available from Arlon, Inc, Santa Ana, Calif.).; NELCO® N4000-6 and N5000-30/32 (available from Park Electrochemical Corp., Melville, N.Y.); ISOLA™ FR406 (available from Isola Group, Chandler, Ariz.), especially IS620; fluoropolymer family (suitable for fluorescence detection since it has low background fluorescence); polyimide family; polyester; polyethylene naphthalate; polycarbonate; polyetheretherketone; liquid crystal polymer; cyclo-olefin copolymer (COC); cyclo-olefin polymer (COP); aramid; THERMOUNT® nonwoven aramid reinforcement (available from DuPont, Wilmington, Del.); NOMEX® brand fiber (available from DuPont, Wilmington, Del.); and paper. Various materials are also suitable for use as the dielectric component of the substrate. Examples include: vapor deposited dielectric, such as PARYLENE™ C (especially on glass), PARYLENE™ N, and PARYLENE™ HT (for high temperature, ~300° C.) (available from Parylene Coating Services, Inc., Katy, Tex.); TEFLON® AF coatings; cytop; soldermasks, such as liquid photoimageable soldermasks (e.g., on PCB) like TAIYO™ PSR4000 series, TAIYO™ PSR and AUS series (available from Taiyo America, Inc. Carson City, Nev.) (good thermal characteristics for applications involving thermal control), and PROBIMER™ 8165 (good thermal characteristics for applications involving thermal control (available from Huntsman Advanced Materials Americas Inc., Los Angeles, Calif.); dry film soldermask, such as those in the VACREL® dry film soldermask line (available from DuPont, Wilmington, Del.); film dielectrics, such as polyimide film (e.g., KAPTON® polyimide film, available from DuPont, Wilmington, Del.), polyethylene, and fluoropolymers (e.g., FEP), polytetrafluoroethylene; polyester; polyethylene naphthalate; cyclo-olefin copolymer (COC); cyclo-olefin polymer (COP); any other PCB substrate material listed above; black matrix resin; polypropylene; and black flexible circuit materials, such as DuPont™ Pyralux® HXC and DuPont™ Kapton® MBC (available from DuPont, Wilmington, Del.).

Droplet transport voltage and frequency may be selected for performance with reagents used in specific assay protocols. Design parameters may be varied, e.g., number and placement of on-actuator reservoirs, number of independent electrode connections, size (volume) of different reservoirs, placement of magnets/bead washing zones, electrode size, inter-electrode pitch, and gap height (between top and bottom substrates) may be varied for use with specific reagents, protocols, droplet volumes, etc. In some cases, a substrate of the present disclosure may be derivatized with low surface-energy materials or chemistries, e.g., using deposition or in situ synthesis using poly- or per-fluorinated compounds in solution or polymerizable monomers. Examples include TEFLON® AF coatings and FLUOROPEL® coatings for dip or spray coating, other fluorinated monomers for plasma-enhanced chemical vapor deposition (PECVD), and organosiloxane (e.g., SiOC) for PECVD. Additionally, in some cases, some portion or all of the droplet operations surface may be coated with a substance for reducing background noise, such as background fluorescence from a PCB substrate. For example, the noise-reducing coating may include a black matrix resin, such as the black matrix resins available from Toray industries, Inc., Japan. Electrodes of a droplet actuator are typically controlled by a controller or a processor, which is itself provided as part of a system, which may include processing functions as well as data and software storage and input and output capabilities. Reagents may be provided on the droplet actuator in the droplet operations gap or in a reservoir fluidly coupled to the droplet operations gap. The reagents may be in liquid form, e.g., droplets, or they may be provided in a reconstitutable form in the droplet operations gap or in a reservoir fluidly coupled to the droplet operations gap. Reconstitutable reagents may typically be combined with liquids for reconstitution. An example of reconstitutable reagents suitable for use with the methods and apparatus set forth herein includes those described in Meathrel et al., U.S. Pat. No. 7,727,466, entitled "Disintegratable Films for Diagnostic Devices," issued on Jun. 1, 2010, the entire disclosure of which is incorporated herein by reference.

As used herein, the term "droplet(s) operation" means any manipulation of one or more droplets on a droplet actuator. A droplet operation may, for example, include: loading a droplet into the droplet actuator; dispensing one or more droplets from a source droplet; splitting, separating or dividing a droplet into two or more droplets; transporting a droplet from one location to another in any direction; merging or combining two or more droplets into a single droplet; diluting a droplet; mixing a droplet; agitating a droplet; deforming a droplet; retaining a droplet in position; incubating a droplet; heating a droplet; vaporizing a droplet; cooling a droplet; disposing of a droplet; transporting a droplet out of a droplet actuator; other droplet operations described herein; and/or any combination of the foregoing. The terms "merge," "merging," "combine," "combining" and the like are used to describe the creation of one droplet from two or more droplets. It should be understood that when such a term is used in reference to two or more droplets, any combination of droplet operations that are sufficient to result in the combination of the two or more droplets into one droplet may be used. For example, "merging droplet A with droplet B," can be achieved by transporting droplet A into contact with a stationary droplet B, transporting droplet B into contact with a stationary droplet A, or transporting droplets A and B into contact with each other. The terms "splitting," "separating" and "dividing" are not intended to imply any particular outcome with respect to volume of the resulting droplets (i.e., the volume of the resulting droplets can be the same or different) or number of resulting droplets (the number of resulting droplets may be 2, 3, 4, 5 or more). The term "mixing" refers to droplet operations which result in more homogenous distribution of one or more components within a droplet. Examples of "loading" droplet operations include microdialysis loading, pressure assisted loading, robotic loading, passive loading, and pipette loading. Droplet operations may be electrode-mediated. In some cases, droplet operations are further facilitated by the use of hydrophilic and/or hydrophobic regions on surfaces and/or by physical obstacles. For examples of droplet operations, see the patents and patent applications cited above under the definition of "droplet actuator." Impedance or capacitance sensing or imaging techniques may sometimes be used to determine or confirm the outcome of a droplet operation. Examples of such techniques are described in Sturmer et al., U.S. Patent Pub. No. 20100194408, entitled "Capacitance Detection in a Droplet Actuator," published on Aug. 5, 2010, the entire disclosure of which is incorporated herein by reference. Generally speaking, the sensing or imaging techniques may be used to confirm the presence or absence of a droplet at a specific electrode. For example, the presence of a dispensed droplet at the destination electrode following a droplet dispensing operation confirms that the droplet dispensing operation was effective. Similarly, the presence of a droplet at a detection spot at an appropriate step in an assay protocol may confirm that a previous set of droplet operations has successfully produced a droplet for detection. Droplet transport time can be quite fast. For example, in various embodiments, transport of a droplet from one electrode to the next may exceed about 1 sec, or about 0.1 sec, or about 0.01 sec, or about 0.001 sec. In one embodiment, the electrode is operated in AC mode but is switched to DC mode for imaging. It is helpful for conducting droplet operations for the footprint area of droplet to be similar to electrowetting area; in other words, 1×-, 2×-3×-droplets are usefully controlled operated using 1, 2, and 3 electrodes, respectively. If the droplet footprint is greater than number of electrodes available for conducting a droplet operation at a given time, the difference between the droplet size and the number of electrodes should typically not be greater than 1; in other words, a 2× droplet is usefully controlled using 1 electrode and a 3× droplet is usefully controlled using 2 electrodes. When droplets include beads, it is useful for droplet size to be equal to the number of electrodes controlling the droplet, e.g., transporting the droplet.

As used herein, the term "filler fluid" means a fluid associated with a droplet operations substrate of a droplet actuator, which fluid is sufficiently immiscible with a droplet phase to render the droplet phase subject to electrode-mediated droplet operations. For example, the droplet operations gap of a droplet actuator is typically filled with a filler fluid. The filler fluid may, for example, be or include a low-viscosity oil, such as silicone oil or hexadecane filler fluid. The filler fluid may be or include a halogenated oil, such as a fluorinated or perfluorinated oil. The filler fluid may fill the entire gap of the droplet actuator or may coat one or more surfaces of the droplet actuator. Filler fluids may be conductive or non-conductive. Filler fluids may be selected to improve droplet operations and/or reduce loss of reagent or target substances from droplets, improve formation of microdroplets, reduce cross contamination between droplets, reduce contamination of droplet actuator surfaces, reduce degradation of droplet actuator materials, etc. For example, filler fluids may be selected for compatibility with droplet actuator materials. As an example, fluorinated filler fluids may be usefully employed with fluorinated surface coatings. Fluorinated filler fluids are useful to reduce loss of lipophilic compounds, such as umbelliferone substrates like 6-hexadecanoylamido-4-methylumbelliferone substrates (e.g., for use in Krabbe, Niemann-Pick, or other assays); other umbelliferone substrates are described in Winger et al., U.S. Patent Pub. No. 20110118132, entitled "Enzymatic Assays Using Umbelliferone Substrates with Cyclodextrins in Droplets of Oil," published on May 19, 2011, the entire disclosure of which is incorporated herein by reference. Examples of suitable fluorinated oils include those in the Galden line, such as Galden HT170 (bp=170° C., viscosity=1.8 cSt, density=1.77), Galden HT200 (bp=200 C, viscosity=2.4 cSt, d=1.79), Galden HT230 (bp=230 C, viscosity=4.4 cSt, d=1.82) (all from Solvay Solexis); those in the Novec line, such as Novec 7500 (bp=128 C, viscosity=0.8 cSt, d=1.61), Fluorinert FC-40 (bp=155° C., viscosity=1.8 cSt, d=1.85), Fluorinert FC-43 (bp=174° C., viscosity=2.5 cSt, d=1.86) (both from 3M). In general, selection of perfluorinated filler fluids is based on kinematic viscosity (<7 cSt is preferred, but not required), and on boiling point (>150° C. is preferred, but not required, for use in DNA/RNA-based applications (PCR, etc.)). Filler fluids may, for example, be doped with surfactants or other additives. For example, additives may be selected to improve droplet operations and/or reduce loss of reagent or target substances from droplets, formation of microdroplets, cross contamination between droplets, contamination of droplet actuator surfaces, degradation of droplet actuator materials, etc. Composition of the filler fluid, including surfactant doping, may be selected for performance with reagents used in the specific assay protocols and effective interaction or non-interaction with droplet actuator materials. Examples of filler fluids and filler fluid formulations suitable for use with the methods and apparatus set forth herein are provided in Srinivasan et al, International Patent Pub. No. WO/2010/027894, entitled "Droplet Actuators, Modified Fluids and Methods," published on Jun. 3, 2010; Srinivasan et al, International Patent Pub. No. WO/2009/021173, entitled "Use of Additives for Enhancing Droplet Operations," published on Feb. 12, 2009; Sista et al., International Patent Pub. No. WO/2008/098236, entitled "Droplet Actuator Devices and Methods Employing Magnetic Beads," published on Jan. 15, 2009; and Monroe et al., U.S. Patent Pub. No.

20080283414, entitled "Electrowetting Devices," published on Nov. 20, 2008, the entire disclosures of which are incorporated herein by reference, as well as the other patents and patent applications cited herein. Fluorinated oils may in some cases be doped with fluorinated surfactants, e.g., Zonyl FSO-100 (Sigma-Aldrich) and/or others. A filler fluid is typically a liquid. In some embodiments, a filler gas can be used instead of a liquid.

As used herein, "alkyl" refers to a straight or branched hydrocarbon chain that is fully saturated (i.e., contains no double or triple bonds). The alkyl group may have 1 to 20 carbon atoms (whenever it appears herein, a numerical range such as "1 to 20" refers to each integer in the given range; e.g., "1 to 20 carbon atoms" means that the alkyl group may consist of 1 carbon atom, 2 carbon atoms, 3 carbon atoms, etc., up to and including 20 carbon atoms, although the present definition also covers the occurrence of the term "alkyl" where no numerical range is designated). The alkyl group may also be a medium size alkyl having 1 to 9 carbon atoms. The alkyl group could also be a lower alkyl having 1 to 4 carbon atoms. The alkyl group may be designated as "$C_{1-4}$ alkyl" or similar designations. By way of example only, "$C_{1-4}$ alkyl" indicates that there are one to four carbon atoms in the alkyl chain, i.e., the alkyl chain is selected from the group consisting of methyl, ethyl, propyl, iso-propyl, n-butyl, iso-butyl, sec-butyl, and t-butyl. Typical alkyl groups include, but are in no way limited to, methyl, ethyl, propyl, isopropyl, butyl, isobutyl, tertiary butyl, pentyl, hexyl, and the like.

As used herein, "alkoxy" refers to the formula —OR wherein R is an alkyl as is defined above, such as "$C_{1-9}$ alkoxy", including but not limited to methoxy, ethoxy, n-propoxy, 1-methylethoxy (isopropoxy), n-butoxy, iso-butoxy, sec-butoxy, and tert-butoxy, and the like.

As used herein, "alkenyl" refers to a straight or branched hydrocarbon chain containing one or more double bonds. The alkenyl group may have 2 to 20 carbon atoms, although the present definition also covers the occurrence of the term "alkenyl" where no numerical range is designated. The alkenyl group may also be a medium size alkenyl having 2 to 9 carbon atoms. The alkenyl group could also be a lower alkenyl having 2 to 4 carbon atoms. The alkenyl group may be designated as "$C_{2-4}$ alkenyl" or similar designations. By way of example only, "$C_{2-4}$ alkenyl" indicates that there are two to four carbon atoms in the alkenyl chain, i.e., the alkenyl chain is selected from the group consisting of ethenyl, propen-1-yl, propen-2-yl, propen-3-yl, buten-1-yl, buten-2-yl, buten-3-yl, buten-4-yl, 1-methyl-propen-1-yl, 2-methyl-propen-1-yl, 1-ethyl-ethen-1-yl, 2-methyl-propen-3-yl, buta-1,3-dienyl, buta-1,2,-dienyl, and buta-1,2-dien-4-yl. Typical alkenyl groups include, but are in no way limited to, ethenyl, propenyl, butenyl, pentenyl, and hexenyl, and the like.

As used herein, "cycloalkyl" means a fully saturated carbocyclyl ring or ring system. Examples include cyclopropyl, cyclobutyl, cyclopentyl, and cyclohexyl.

As used herein, "aryl" refers to an aromatic ring or ring system (i.e., two or more fused rings that share two adjacent carbon atoms) containing only carbon in the ring backbone. When the aryl is a ring system, every ring in the system is aromatic. The aryl group may have 6 to 18 carbon atoms, although the present definition also covers the occurrence of the term "aryl" where no numerical range is designated. In some embodiments, the aryl group has 6 to 10 carbon atoms. The aryl group may be designated as "$C_{6-10}$ aryl," "$C_6$ or $C_{10}$ aryl," or similar designations. Examples of aryl groups include, but are not limited to, phenyl, naphthyl, azulenyl, and anthracenyl.

The term "halogen" or "halo," as used herein, means any one of the radio-stable atoms of column 7 of the Periodic Table of the Elements, e.g., fluorine, chlorine, bromine, or iodine, with fluorine and chlorine being preferred.

As used herein, the term "CYTOP" refers to an amorphous fluoropolymer. It has the same chemical, thermal, electrical and surface properties as conventional fluoropolymers. In addition, it has high optical transparency and good solubility in specific fluorinated solvent due to amorphous morphology. CYTOP is a trademark registered in Japan. In some embodiments, CYTOP has the following backbone structure:

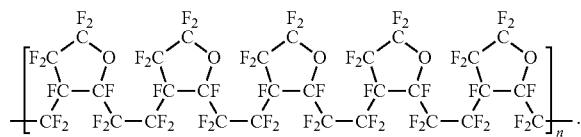

As used herein, the term "contacting angle" refers to the angle, measured through the liquid, where a liquid interface meets a solid surface.

As used herein, the term "covalently linking" or "covalently bonding" refers to the forming of a chemical bonding that is characterized by the sharing of pairs of electrons between atoms. For example, a "covalently attached polymer sheet," when used in reference to a substrate surface, refers to a polymer sheet that forms chemical bonds with a functionalized surface of a substrate, as compared to attachment to the surface via other means, for example, adhesion or electrostatic interaction. It will be appreciated that polymers that are attached covalently to a surface can also be bonded via other means in addition to covalent attachment.

As used herein, the term "non-covalent interaction" differs from a covalent bond in that it does not involve the sharing of electrons, but rather involves more dispersed variations of electromagnetic interactions between molecules or within a molecule. Non-covalent interactions can be generally classified into four categories, electrostatic, π-effects, van der Waals forces, and hydrophobic effects. Non-limiting examples of electrostatic interactions include ionic interactions, hydrogen bonding (a specific type of dipole-dipole interaction), halogen bonding, etc. Van der Waals forces are a subset of electrostatic interaction involving permanent or induced dipoles or multipoles. π-effects can be broken down into numerous categories, including (but not limited to) π-π interactions, cation-π & anion-π interactions, and polar-π interactions. In general, π-effects are associated with the interactions of molecules with the π-orbitals of a molecular system, such as benzene. The hydrophobic effect is the tendency of nonpolar substances to aggregate in aqueous solution and exclude water molecules. Non-covalent interactions can be both intermolecular and intramolecular.

As used herein, the term "primer" is defined as a single strand DNA (ssDNA) molecule with a free 3' OH group and a modification at the 5' terminus to allow the coupling reactions. The primer length can be any number of bases long and can include a variety of non-natural nucleotides. In some embodiments, "SBS primers" are used as part of a sequencing by synthesis (SBS) reaction on a system such as the HiSeq®, MiSeq® or NextSeq® systems from Illumina (San Diego, Calif.). In these reactions, a set of amplification primers are typically bound to a glass surface. A set of target DNA molecules to be sequenced is hybridized to the bound primers and then amplified by a bridge amplification process. The sequencing reactions are carried out, and in embodiments of the invention, the amplification primers (and amplicons including primers extended during amplification steps to include copies of the target DNA) are then unbound from the glass surface so that the surface is reusable in future sequencing reactions. Thus, one or more of the steps of attaching amplification primers to the glass surface, hybridizing target DNA molecules to the primers, bridge amplification, sequencing the target DNA, and removing amplification primers and amplicons can be repeated. One or more repetition can be carried out. In some embodiments, the SBS primers can be the P5 or P7 primers in one embodiment, as detailed below. The P5 and P7 primers are used on the surface of commercial flow cells sold by Illumina Inc. for sequencing on the HiSeq®, MiSeq®, NextSeq® and Genome Analyzer® platforms. The primer sequences are described in US Pat. Pub. No. 2011/0059865 A1, which is incorporated herein by reference in its entirety.

The P5 and P7 primer sequences comprise the following:

```
Paired end set:
P5: paired end 5'→3'
AATGATACGGCGACCACCGAGAUCTACAC

P7: paired end 5'→3'
CAAGCAGAAGACGGCATACGAG*AT

Single read set:
P5: single read: 5'→3'
AATGATACGGCGACCACCGA

P7: single read 5'→3'
CAAGCAGAAGACGGCATACGA
```

Optionally, one or both of the P5 and P7 primers can include a poly T tail. The poly T tail is generally located at the 5' end of the above sequences, but in some cases can be located at the 3' end. The poly T sequence can include any number of T nucleotides, for example, from 2 to 20.

Some embodiments of the present application are directed to a microfluidic device with improved droplet operation, having a hydrophobic surface, a droplet actuator, and a filler fluid, wherein the filler fluid contains a surface regenerative molecule for regenerating hydrophobicity of the hydrophobic surface of the microfluidic device.

In some embodiments, the microfluidic device is a digital microfluidic device that employs mechanisms selected from electrowetting, opto-electrowetting, electrostatic, electrophoretic, dielectrophoretic, electro-osmotic, or combinations thereof. In one embodiment, the digital microfluidic device employs an electrowetting mechanism. In some such embodiments, the digital microfluidic device comprises microtracks or micropaths of electrodes.

In some embodiments, the hydrophobic surface of the microfluidic device comprises one or more hydrophobic coating layers of the droplet actuator.

In some embodiments, the microfluidic device comprises a patterned sequencing region, and the patterned sequencing region comprises both a hydrophilic surface area and a hydrophobic surface area, for example, an interstitial area. In some such embodiments, the hydrophobic surface of the microfluidic device comprises the hydrophobic surface area in the patterned sequencing region.

Microfluidic Cartridges

In some embodiments, the microfluidic device of the present application is a digital fluidic device containing a digital fluidic cartridge. A typical embodiment of a digital fluidic cartridge 100 is illustrated in FIG. 1. The digital fluidic cartridge includes a top plate 101, often made of plastic, two hydrophobic coating layers 102a and 102b, a dielectric coating layer 104, and a printed circuit board (PCB) 106 bottom with tracks or paths of electrode 105 in between one hydrophobic layer 102b and the dielectric coating layer 104. The space or gap between the two hydrophobic layers can be filled with a filler fluid 103 which is immiscible with the sample or reagent droplets. The droplet movement is triggered by the voltage potential of the digital fluidic cartridge. An embodiment of the microfluidic device cartridge of the present disclosure has a plastic top plate coated with a conductive coating layer of poly(3,4-ethylenedioxythiophene) (PEDOT) and an anionic polymer polystyrene sulfonic acid (PSS) or polystyrene sulfonate.

In some embodiments, the hydrophobic surface of the microfluidic device comprises one or more hydrophobic coating layers. In some such embodiments, the hydrophobic coating layer comprises a fluoropolymer. In one embodiment, the hydrophobic coating layers of the microfluidic cartridge comprise a fluoropolymer CYTOP.

In any embodiments of the micro fluidic device described herein, the filler fluid used in the microfluidic device is typically a low-viscosity lipophilic oil that is immiscible with the sample fluid or reagents, for example, a silicon oil or a hydrocarbon oil. In some other embodiments, the filler fluid comprises fluorinated hydrocarbons. In one embodiment, the filler fluid comprises polydimethylsiloxane (PDMS).

PDMS:

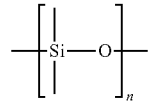

In another embodiment, the filler fluid comprises both PDMS and a surfactant Span85. In some embodiments, the concentration of Span85 is 0.005% w/w of the filler fluid. In other embodiments, the concentration of Span85 is approximately 0.0025% w/w of the filler fluid.

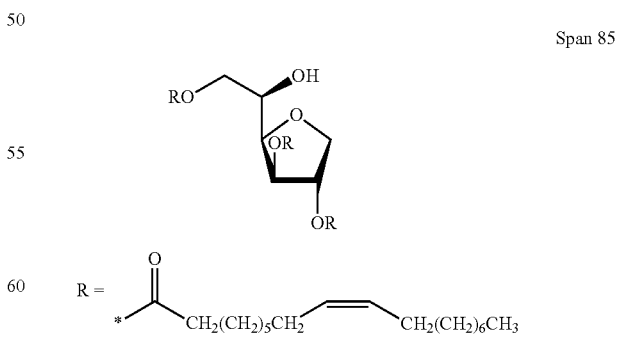

Figures 2A, 2B:
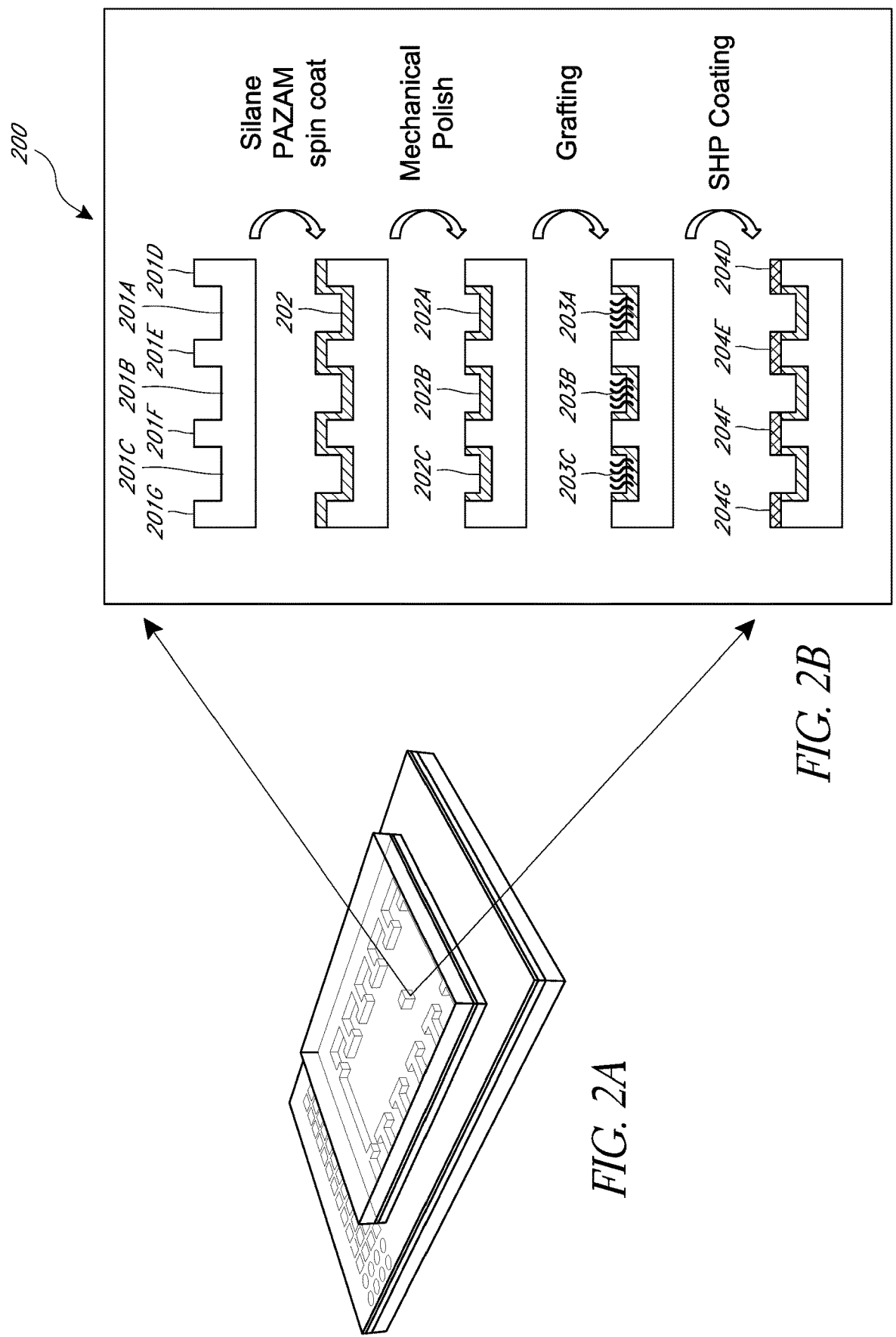
FIG. 2A is schematic view of a digital microfluidic cartridge.
FIG. 2B is an enlarged view of the workflow to prepare a patterned sequencing region on the digital microfluidic cartridge of FIG. 2A.

FIG. 2A is a schematic view of a digital fluidic cartridge where the whole cartridge is coated with a fluoropolymer and has a fully hydrophobic surface. In one embodiment, the fluoropolymer coating is CYTOP.

In some embodiments, the microfluidic cartridge described herein further contains a sequencing region. In some embodiments, such sequencing region contains microscale or nanoscale patterns, such as channels, trenches, posts, wells, or combinations thereof. Micro-scale patterns include, for example, those having features with dimensions (e.g. average diameter or average cross section) in the range of about 1 micron to about 999 microns. Nanoscale patterns include, for example, those having features with dimensions (e.g. average diameter or average cross section) in the range of about 1 nanometer to about 999 nanometers.

FIG. 2B illustrates an enlarged view of a patterned sequencing region on the digital fluidic cartridge of FIG. 2A. The sequencing region includes patterned silicon dioxide dies for sequencing-by-synthesis applications. The sequencing area can be prepared by the following method: providing a silicon dioxide die 200 comprising nanowell patterns (201A, 201B and 201C) and interstitial regions (201D, 201E, 201F and 201G); spin coating a norbornene derivatized silane (for example, [(5-bicyclo[2.2.1]hept-2-enyl)ethyl]trimethoxysilane) and a hydrogel to the surface of the dies, reacting the norbornene and the hydrogel to form covalent bonding thus forming a continuous hydrogel coating layer 202; mechanically polishing the surface to remove any hydrogel on the interstitial regions of the sequencing area, leaving hydrogel in the nanowells to form discrete hydrogel patterns 202A, 202B and 202C; grafting primers 203A, 203B and 203C to the bottom of the nanowells 201A, 201B and 201C by reacting with the hydrogel 202A, 202B and 202C inside the nanowells; subsequent coating of fluorosilane onto the interstitial area (201D, 201E, 201F and 201G) to form a hydrophobic surface 204D, 204E, 204F and 204G, render the finished surface semi-hydrophobic (i.e., a surface containing both hydrophilic nanowells and hydrophobic interstitial regions). The patterned sequencing region includes both hydrophilic polymer in the nanowells to support SBS and a hydrophobic surface area for droplet motion. In some cases, the surface of the sequencing region is referred to as a semi-hydrophobic surface. The fluorosilane coated interstitial hydrophobic surface area can be a monolayer or multilayers.

In some embodiments, the hydrogel used for sequencing application is a polymer composition comprises poly(N-(5-azidoacetamidylpentyl) acrylamide-co-acrylamide) (PAZAM). In some embodiments, PAZAM is also represented by Formula (A) or (B):

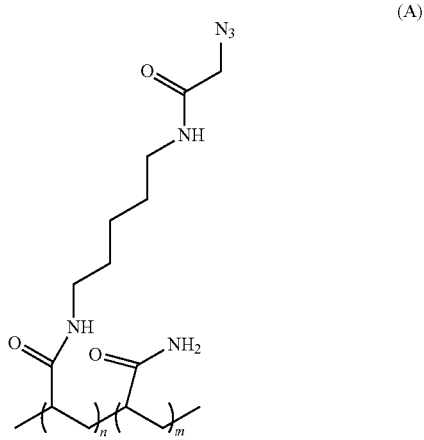

(A)

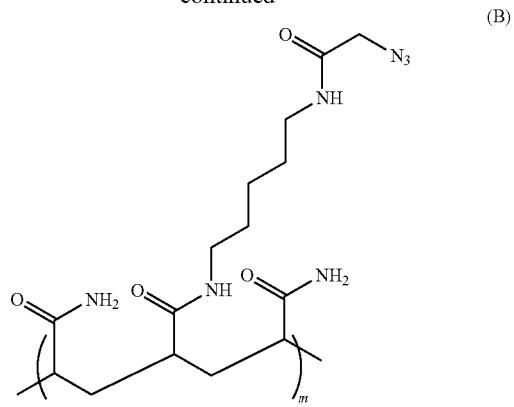

(B)

wherein n is an integer in the range of 1-20,000, and m is an integer in the range of 1-100,000.

PAZAM can be prepared by polymerization of acrylamide and Azapa (N-(5-(2-azidoacetamido)pentyl)acrylamide) in any ratio. In some embodiments, PAZAM is a linear polymer. In some other embodiments, PAZAM is a lightly cross-linked polymer. In some embodiments, PAZAM is applied as an aqueous solution. In some other embodiments, PAZAM is applied as an aqueous solution with one or more solvent additives, such as ethanol. The method for preparation different PAZAM polymers is discussed in details in U.S. Pat. No. 9,012,022, which is hereby incorporated by reference in its entirety. In some embodiments, PAZAM may be mixed with one or more polymers or hydrogels in the preparation of the polymer composition described herein.

In some embodiments, the sample or reagent droplet is an aqueous-based. In some other embodiments, the sample or reagent droplet comprises a mixture of water and one or more organic solvents such as alcoholic solvents. In some other embodiments, the sample or reagent droplet contains only one or more organic solvents. In some embodiment, the droplet comprises a biological sample, such as nucleic acid.

In some embodiments, the microfluidic device comprises a patterned sequencing region, said patterned sequencing region comprising both a hydrophilic surface area and a hydrophobic surface area and the hydrophobic surface of the microfluidic device comprises the hydrophobic surface area of the sequencing region. In one embodiment, the hydrophilic part of the sequencing surface area comprises PAZAM and the hydrophobic part of the sequencing surface area comprises FOTMS (1H,1H,2H,2H-Perfluorooctyltrimethoxysilane).

Figure 4:
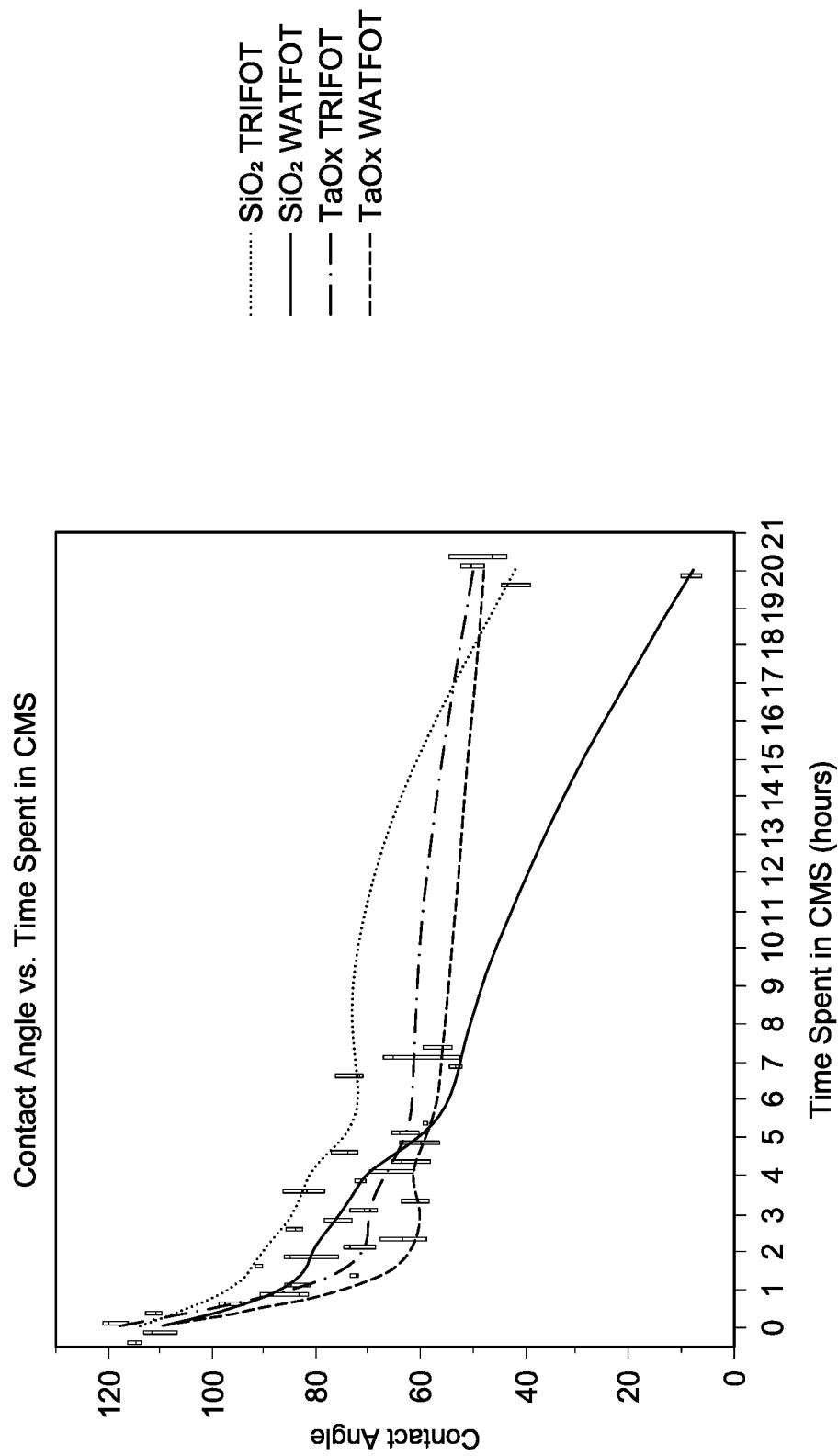
FIG. 4 is a line chart illustrating the change in contact angle of various substrate surfaces as a function of time in the cleavage mixing for sequencing (CMS) solution.

During SBS applications, the hydrophobic surfaces of the microfluidic cartridge is in contact with one or more SBS reagents, for example, cleavage mixing for sequencing (CMS), which is basic and may cause the degradation of the hydrophobic coatings of the microfluidic device at elevated temperature for prolonged time. In some instances, the degradation is caused by hydrolysis of the silanol bonds. FIG. 4 is a line chart illustrating the contact angle of various substrate surfaces as a function of time in the cleavage mixing for sequence (CMS) solution. The exposed interstitial hydrophobic surface of the sequencing region is sensitive to pH, temperature, and time. Because all the SBS reagents are basic and the sequencing runs are long and take places at 60° C., one-hour immersion in CMS results in 25% loss in contact angel.

Some embodiments of the present application are directed to a method for improving droplet operation in a microfluidic device, comprising contacting a hydrophobic surface of the microfluidic device with a filler fluid containing a surface regenerative molecule, wherein the contacting regenerates hydrophobicity of the hydrophobic surface. The surface regenerative molecule may be premixed with the filler fluid before the start of the droplet operation. Alternatively, the surface regenerative molecule may be added to the filler fluid during droplet operation. The restoration of the hydrophobicity of the surface is measured by contact angle of the surface. In some embodiments, the method described herein results in the restore of the contact angle to about 50%, about 55%, about 60%, about 65%, about 70%, about 75%, about 80%, about 85%, about 90%, about 95%, or about 100% of the original contact angle of the hydrophobic surface, or a range defined by any of the two preceding values. In some embodiments, the method described herein results in an increase of the contact angle of the hydrophobic surface of the micro fluidic device, to about 105%, about 110%, about 115%, about 120, or about 125%, or a range defined by any of the two preceding values.

In some embodiments, the surface regenerative molecule also prevents the degradation of the device and reagents comprised in the droplet.

Surface Regenerative Molecules

As used herein, a surface regenerative molecule may refer to a lipophilic compound or polymer that is capable of restoring the hydrophobicity of a hydrophobic surface of the microfluidic device. The surface regenerative molecule may be immiscible with the droplets. In some embodiments, the restoration or regeneration of the hydrophobicity is achieved by covalent linking the surface regenerative molecule to the hydrophobic surface. In some other embodiments, the restoration or regeneration of the hydrophobicity is achieved by non-covalent interaction between the surface regenerative molecule and the hydrophobic surface. In one embodiment, the non-covalent interaction is a Van der Waals interaction. In some embodiments, the surface regenerative molecule does not comprise a surfactant. In one embodiment, the surface regenerative molecule is not Span85.

In some embodiments, the surface regenerative molecule comprises a silane derivative, a halogenated silane derivative, a fluorinated siloxane polymer, a hydrocarbon, a halogenated hydrocarbon, or combinations thereof. In some such embodiments, the silane derivative is a siloxane. In some further embodiments, the halogenated silane derivative comprises fluorinated siloxanes. In some such embodiments, the silane derivative comprises one or more silanols, for example, dimethylsiloxane (DMS) or hydroxy dimethylsiloxane (DMS-OH).

DMS-OH:

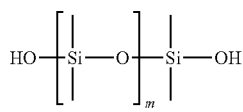

In some such embodiments, the halogenated silane derivative is a fluorinated silane derivative having a lipophilic fluorinated hydrocarbon moiety and a silane moiety. The hydrocarbon chain can contain 1 to 50 carbon atoms, preferably 1 to 20 carbon atoms, more preferably 5 to 10 carbon atoms. In some such embodiments, the silane moiety has the structure

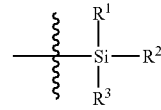

where each $R^1$, $R^2$ and $R^3$ is independently selected from alkyl, alkenyl, cycloalkyl, aryl, alkoxy, hydroxy, or halo. In one embodiment, the fluorinated silane derivative comprises FOTMS. In another embodiment, the fluorinated silane derivative comprises FOS-X. In another embodiment, the fluorinated silane derivative comprises hydroxy terminated trifluorooctyl silane (HOTS).

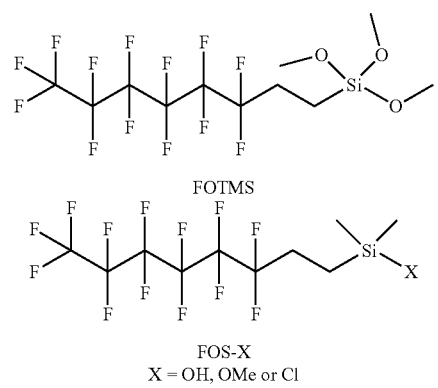

FOTMS

FOS-X
X = OH, OMe or Cl

In some other embodiments, the halogenated silane derivative is a siloxane having one or more lipophilic fluorinated side-chains and a siloxane moiety. In some such embodiments, the fluorinated side chain is a fluorinated hydrocarbon chain. In some instances, the hydrocarbon chain can be optionally substituted with one or more halogen atoms; alternatively, one or more carbon atoms in the hydrocarbon chain can be replaced with a heteroatom, such as O, S, N, P, Si, etc. In one embodiment, the halogenated siloxane is a fluorinated siloxane SIB1816. SIB1816 is also known as 1,3-bis(tridecafluoro-1,1,2,2,-tetrahydrooctyl)tetramethyldisiloxane, having the following structure:

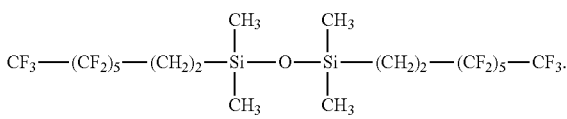

SIB1816 contains polarizable bonds and therefore may be forced into the CYTOP matrix by electrowetting.

In some embodiments, the surface regenerative molecule comprises a fluorinated siloxane polymer of Formula (I):

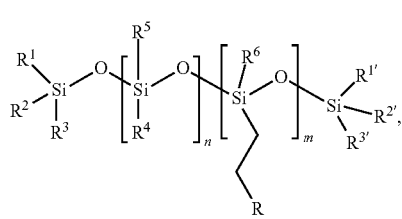

R = fluorinated side-chains wherein each $R^1$, $R^2$, $R^3$, $R^{1'}$, $R^{2'}$, $R^{3'}$, $R^4$, $R^5$ and $R^6$ is independently selected from hydrogen, alkyl, alkenyl, cycloalkyl, aryl, alkoxy, hydroxy, or halo. R is a fluorinated side chain, for example, fluorinated hydrocarbon chain containing 1 to 50 carbon atoms, preferably 1 to 20 carbon atoms, more preferably 5 to 10 carbon atoms. Each m and n is an integer independently selected from 1 to 1000. In some such embodiments, the fluorinated hydrocarbon side chain is fluorinated alkyl chain.

In some embodiments, the siloxane polymer of Formula (I) is also represented by Formula (Ia):

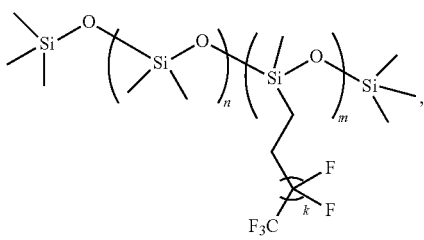

wherein each m and n is an integer independently selected from 1 to 1000, and k is an integer selected from 0 to 100. In one embodiment, the fluorinated siloxane polymer comprises or is FMS 736 of the following structure:

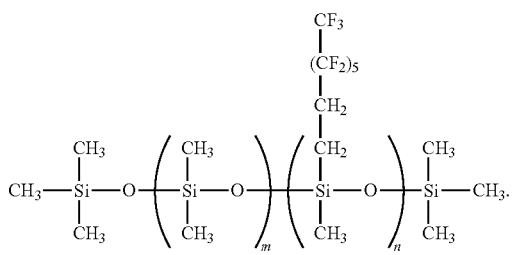

FMS 736 is a copolymer consisting of 15-20% tridecafluorooctylmethylsiloxane and 80-85% dimethylsiloxane. FMS 736 has a molecular weight of about 40K and a viscosity of between about 4000 and about 7000 cSt. In another embodiment, the fluorinated siloxane polymer comprises or is selected from FMS 121 or FMS 141, or combinations thereof. FMS 121 and FMS 141 have the general structure:

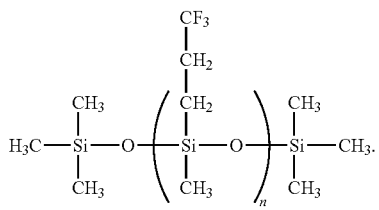

FMS 121 has a molecular weight of between about 900 and 1000, and a viscosity of between about 80 and about 120 cSt. FMS 141 has a molecular weight of about 14 k and a viscosity of about 10 k cSt.

The halogenated silane derivatives, fluorinated siloxanes, or siloxane polymers with fluorinated side-chains interact with the CYTOP surface and facilitate droplet motion. For example, the siloxane polymers may accumulate at the interface between the CYTOP and the filler fluid, as it shares affinity for both CYTOP and the filler fluid. This accumulation at the interface may result in the formation of a thin layer of surfactant at the surface that protects the CYTOP coating from etching. The accumulation of the surface regenerative molecule can either fill the pores/defect of the CYTOP surface or act as a protective barrier/hydrophobic layer. In addition, the addition of these surface regenerative molecule also protect the protein or enzyme inside the sample droplets from electrolysis, which is a commonly observed failure in digital fluidic devices due to current leaking through the defects in the CYTOP coating.

The surface regenerative molecule may act as a dynamic barrier that increase the robustness of the cartridge assembly and minimize current leaking. This dynamic barrier is in constant equilibrium with the filler fluid as the surface regenerative molecular has greater solubility in the filler fluid, resulting in a continuous self-healing replenishment of the barrier as it is depleted by adverse reaction occurring during digital fluidic operations. Therefore, the addition the surface regenerative molecule to the filler fluid formulation could drastically increase the life span and the robustness of digital fluidic cartridges.

The surface regenerative molecule may be mixed with the filler fluid in various ratios. In some embodiments, the surface regenerative molecule is about 0.001% w/w to about 10.0% w/w of the filler fluid, or about 0.0025% w/w to about 5.0% w/w of the filler fluid, or about 0.005% w/w to about 2.5% w/w of the filler fluid, or about 0.01% w/w to about 1.0% w/w of the filler fluid, or about 0.05% w/w to about 0.5% w/w of the filler fluid, or a range defined by any of the two preceding values. In one embodiment, the surface regenerative molecule is about 1.0% w/w of the filler fluid.

Figure 3A:
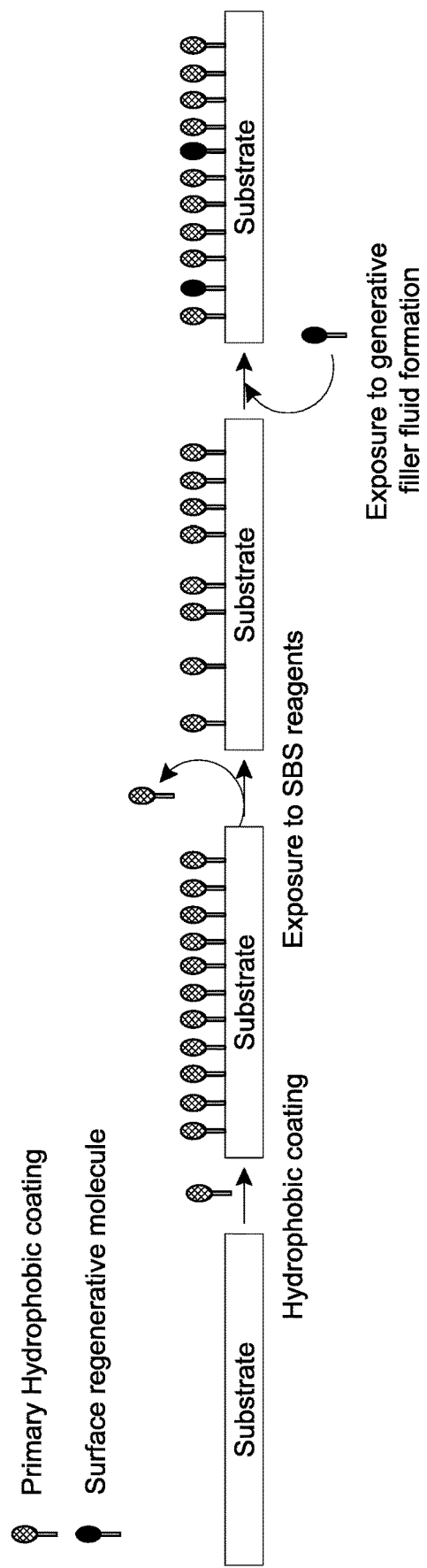
FIG. 3A is a schematic diagram illustrating one embodiment of a process of using surface regenerative molecule containing filler fluid to replenish the loss of hydrophobic coating on a substrate.

FIG. 3A illustrates the process of using surface regenerative molecule containing filler fluid to replenish the loss of hydrophobic coating on a substrate. First, a substrate surface is coated with a primary hydrophobic coating layer. During droplet operation, the hydrophobic surface of the substrate is exposed to SBS reagents, which causes the loss of hydrophobic coating in certain areas of the surface. Then, the hydrophobic surface is exposed to a filler fluid containing a surface regenerative molecule. The surface regenerative molecule reacts or interacts with the surface of the substrate and fixes the defects caused by the SBS reagents; thereby restore the hydrophobicity of the substrate surface.

Figure 3B:
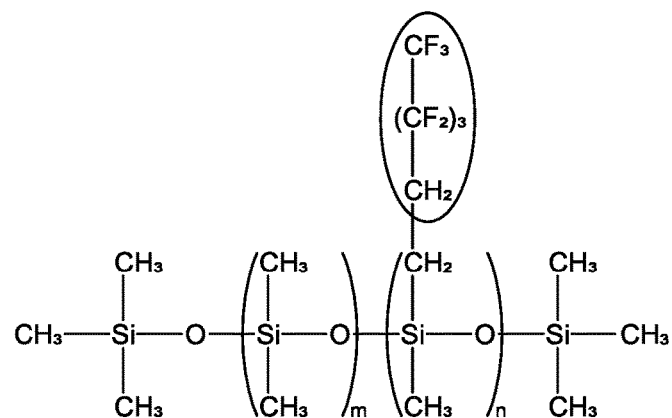
FIG. 3B shows the structure of an embodiment of a surface regenerative molecule FMS 736.
Figure 3C:
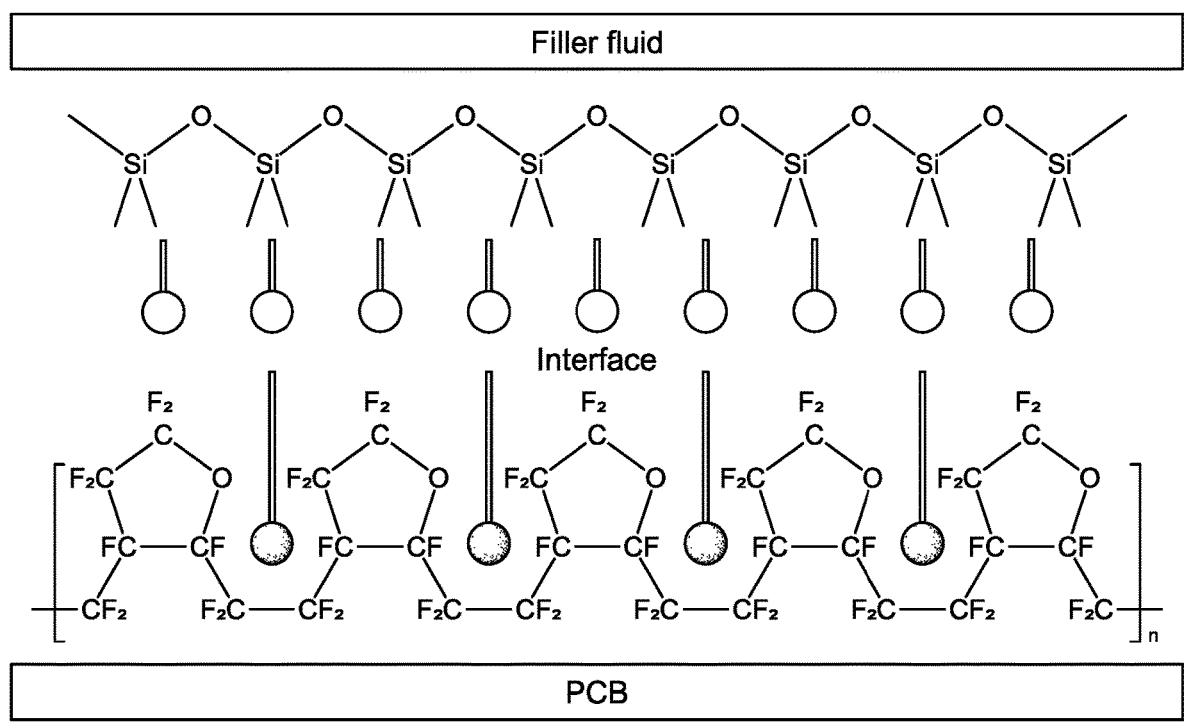
FIG. 3C illustrates the interaction between the filler fluid containing a surface regenerative molecule FMS 736 with the hydrophobic coating CYTOP on a printed circuit board (PCB).

FIG. 3B is an embodiment of a surface regenerative molecule described herein: FMS 736 having a fluorinated alkyl side chain. FIG. 3C illustrates the interaction between the filler fluid (PDMS) containing a siloxane polymer with fluorinated side chain (for example, FMS 736) and the CYTOP coating layer of a printed circuit board (PCB) of a digital fluidic device, as exemplified in FIG. 1. The CYTOP polymer is quite porous, which may result in diffusion the content of a sample fluid (such as water or chemical species) through the CYTPO layer of the PCB. In addition, currents created during the electrowetting process may also leak through defects in the CYTOP coating, causing electrolysis of the droplets. The ideal fluorinated siloxane polymer has the right side chain dimension to fit in the pores of CYTOP, and it also has the right affinity to the surface because of both the CYTOP and the siloxane polymer have the fluorinate alkyl group. These properties of the fluorinated siloxane polymer enable it to act both as a dynamic barrier and an additional hydrophobic coating.

Similarly, the fluorinated siloxane polymer also has the same interaction with the hydrophobic CYTOP coating layer of the top plate. As disclosed herein, the top plate of a digital fluidic cartridge may has a PEDOT:PSS conductive layer. It has been that PSS can inhibit enzyme activity by leaching through the underlying hydrophobic coating of the device, and causing enzyme inhibition in the sample fluid. The PSS leaching could be detrimental to the biological sample analysis, for example, the downstream sequencing-by-synthesis process because it may inhibit the amplification or other enzymes in the samples. The surface regenerative molecule may further reduce PSS leaching.

Some embodiments of the present application are directed to a system comprising a microfluidic device described herein coupled to and controlled by a computer processor.

Nucleic Acid Analysis Applications

In some embodiments, the microfluidic device described herein can be used in nucleic acid analysis applications, for example, DNA sequencing. Many different DNA amplification techniques can be used in conjunction with microfluidic device described herein. Exemplary techniques that can be used include, but are not limited to, polymerase chain reaction (PCR), rolling circle amplification (RCA), multiple displacement amplification (MDA), or random prime amplification (RPA). In particular embodiments, one or more primers used for amplification can be attached to a polymer coating. In PCR embodiments, one or both of the primers used for amplification can be attached to a polymer coating. Formats that utilize two species of attached primer are often referred to as bridge amplification because double stranded amplicons form a bridge-like structure between the two attached primers that flank the template sequence that has been copied. Exemplary reagents and conditions that can be used for bridge amplification are described, for example, in U.S. Pat. No. 5,641,658; U.S. Patent Publ. No. 2002/0055100; U.S. Pat. No. 7,115,400; U.S. Patent Publ. No. 2004/0096853; U.S. Patent Publ. No. 2004/0002090; U.S. Patent Publ. No. 2007/0128624; and U.S. Patent Publ. No. 2008/0009420, each of which is incorporated herein by reference. PCR amplification can also be carried out with one of the amplification primers attached to a polymer coating and the second primer in solution. An exemplary format that uses a combination of one attached primer and soluble primer is emulsion PCR as described, for example, in Dressman et al., *Proc. Natl. Acad. Sci. USA* 100:8817-8822 (2003), WO 05/010145, or U.S. Patent Publ. Nos. 2005/0130173 or 2005/0064460, each of which is incorporated herein by reference. Emulsion PCR is illustrative of the format and it will be understood that for purposes of the methods set forth herein the use of an emulsion is optional and indeed for several embodiments an emulsion is not used. Furthermore, primers need not be attached directly to substrate or solid supports as set forth in the ePCR references and can instead be attached to a polymer coating as set forth herein.

RCA techniques can be modified for use in a method of the present disclosure. Exemplary components that can be used in an RCA reaction and principles by which RCA produces amplicons are described, for example, in Lizardi et al., *Nat. Genet.* 19:225-232 (1998) and US 2007/0099208 A1, each of which is incorporated herein by reference. Primers used for RCA can be in solution or attached to a polymer coating.

MDA techniques can be modified for use in a method of the present disclosure. Some basic principles and useful conditions for MDA are described, for example, in Dean et al., *Proc Natl. Acad. Sci. USA* 99:5261-66 (2002); Lage et al., *Genome Research* 13:294-307 (2003); Walker et al., *Molecular Methods for Virus Detection*, Academic Press, Inc., 1995; Walker et al., *Nucl. Acids Res.* 20:1691-96 (1992); U.S. Pat. Nos. 5,455,166; 5,130,238; and 6,214,587, each of which is incorporated herein by reference. Primers used for MDA can be in solution or attached to a polymer coating.

In particular embodiments a combination of the above-exemplified amplification techniques can be used. For example, RCA and MDA can be used in a combination wherein RCA is used to generate a concatameric amplicon in solution (e.g. using solution-phase primers). The amplicon can then be used as a template for MDA using primers that are attached to a polymer coating. In this example, amplicons produced after the combined RCA and MDA steps will be attached to the polymer coating.

In some embodiments, the functionalized hydrogel or polymer sheet coated substrate described herein can be used for determining a nucleotide sequence of a polynucleotide. In such embodiments, the method may include the steps of (a) contacting a polynucleotide polymerase with polynucleotide clusters attached to a surface of a substrate via any one of the polymer or hydrogel coatings described herein; (b) providing nucleotides to the polymer-coated surface of the substrate such that a detectable signal is generated when one or more nucleotides are utilized by the polynucleotide polymerase; (c) detecting signals at one or more polynucleotide clusters; and (d) repeating steps (b) and (c), thereby determining a nucleotide sequence of a polynucleotide present at the one or more polynucleotide clusters.

Nucleic acid sequencing can be used to determine a nucleotide sequence of a polynucleotide by various processes known in the art. In a preferred method, sequencing-by-synthesis (SBS) is utilized to determine a nucleotide sequence of a polynucleotide attached to a surface of a substrate via any one of the polymer coatings described herein. In such process, one or more nucleotides are provided to a template polynucleotide that is associated with a polynucleotide polymerase. The polynucleotide polymerase incorporates the one or more nucleotides into a newly synthesized nucleic acid strand that is complementary to the polynucleotide template. The synthesis is initiated from an oligonucleotide primer that is complementary to a portion of the template polynucleotide or to a portion of a universal or non-variable nucleic acid that is covalently bound at one end of the template polynucleotide. As nucleotides are incorporated against the template polynucleotide, a detectable signal is generated that allows for the determination of which nucleotide has been incorporated during each step of the sequencing process. In this way, the sequence of a nucleic acid complementary to at least a portion of the template polynucleotide can be generated, thereby permitting determination of the nucleotide sequence of at least a portion of the template polynucleotide.

Flow cells provide a convenient format for housing an array that is produced by the methods of the present disclosure and that is subjected to a sequencing-by-synthesis (SBS) or other detection technique that involves repeated delivery of reagents in cycles. For example, to initiate a first SBS cycle, one or more labeled nucleotides, DNA polymerase, etc., can be flowed into/through a flow cell that houses a nucleic acid array made by methods set forth herein. Those sites of an array where primer extension causes a labeled nucleotide to be incorporated can be detected. Optionally, the nucleotides can further include a reversible termination property that terminates further primer extension once a nucleotide has been added to a primer. For example, a nucleotide analog having a reversible terminator moiety can be added to a primer such that subsequent extension cannot occur until a deblocking agent is delivered to remove the moiety. Thus, for embodiments that use reversible termination, a deblocking reagent can be delivered to the flow cell (before or after detection occurs). Washes can be carried out between the various delivery steps. The cycle can then be repeated n times to extend the primer by n nucleotides, thereby detecting a sequence of length n. Exemplary SBS procedures, fluidic systems and detection platforms that can be readily adapted for use with an array produced by the methods of the present disclosure are described, for example, in Bentley et al., Nature 456: 53-59 (2008), WO 04/018497; U.S. Pat. No. 7,057,026; WO 91/06678; WO 07/123744; U.S. Pat. Nos. 7,329,492; 7,211, 414; 7,315,019; 7,405,281, and US 2008/0108082, each of which is incorporated herein by reference in its entirety. In particular embodiments, similar methods to those exemplified above for a flow cell can be carried out using a polymer sheet in place of a flow cell. For example, the polymer sheet can be provided in a roll to roll or belt format to allow repeated delivery of reagents to the surface of the polymer sheet akin to the repeated delivery of reagents to a flow cell. It will be understood that in some embodiments a polymer sheet of the present disclosure can be present in a flow cell for all or part of a sequencing process.

Other sequencing procedures that use cyclic reactions can employ a polymer sheet, substrate or other composition set forth herein, such as pyrosequencing. Pyrosequencing detects the release of inorganic pyrophosphate (PPi) as particular nucleotides are incorporated into a nascent nucleic acid strand (Ronaghi, et al., *Analytical Biochemistry* 242(1), 84-9 (1996); Ronaghi, *Genome Res.* 11(1), 3-11 (2001); Ronaghi et al. *Science* 281(5375), 363 (1998); U.S. Pat. Nos. 6,210,891; 6,258,568 and 6,274,320, each of which is incorporated herein by reference in its entirety). In pyrosequencing, released PPi can be detected by being immediately converted to adenosine triphosphate (ATP) by ATP sulfurylase, and the level of ATP generated can be detected via luciferase-produced photons. Thus, the sequencing reaction can be monitored via a luminescence detection system. Excitation radiation sources used for fluorescence based detection systems are not necessary for pyrosequencing procedures. Useful fluidic systems, detectors and procedures that can be used for application of pyrosequencing to arrays of the present disclosure are described, for example, in WO 12/058096 A1, US 2005/0191698 A1, U.S. Pat. Nos. 7,595, 883, and 7,244,559, each of which is incorporated herein by reference in its entirety.

Sequencing-by-ligation reactions can also be usefully carried out on a polymer sheet, substrate or other composition set forth herein including, for example, those described in Shendure et al. *Science* 309:1728-1732 (2005); U.S. Pat. Nos. 5,599,675; and 5,750,341, each of which is incorporated herein by reference in its entirety. Some embodiments can include sequencing-by-hybridization procedures as described, for example, in Bains et al., *Journal of Theoretical Biology* 135(3), 303-7 (1988); Drmanac et al., *Nature Biotechnology* 16, 54-58 (1998); Fodor et al., *Science* 251 (4995), 767-773 (1995); and WO 1989/10977, each of which is incorporated herein by reference in its entirety. In both sequencing-by-ligation and sequencing-by-hybridization procedures, nucleic acids that are present at sites of an array are subjected to repeated cycles of oligonucleotide delivery and detection. Fluidic systems for SBS methods as set forth herein or in references cited herein can be readily adapted for delivery of reagents for sequencing-by-ligation or sequencing-by-hybridization procedures. Typically, the oligonucleotides are fluorescently labeled and can be detected using fluorescence detectors similar to those described with regard to SBS procedures herein or in references cited herein.

Some embodiments that employ a composition set forth herein can utilize methods involving the real-time monitoring of DNA polymerase activity. For example, nucleotide incorporations can be detected through fluorescence resonance energy transfer (FRET) interactions between a fluorophore-bearing polymerase and γ-phosphate-labeled nucleotides, or with zeromode waveguides (ZMWs). Techniques and reagents for FRET-based sequencing are described, for example, in Levene et al. Science 299, 682-686 (2003); Lundquist et al. *Opt. Lett.* 33, 1026-1028 (2008); Korlach et al. *Proc. Natl. Acad. Sci. USA* 105, 1176-1181 (2008), the disclosures of which are incorporated herein by reference in its entirety.

Some SBS embodiments include detection of a proton released upon incorporation of a nucleotide into an extension product. For example, sequencing based on detection of released protons can use an electrical detector and associated techniques that are commercially available from Ion Torrent (Guilford, Conn., a Life Technologies subsidiary) or sequencing methods and systems described in US 2009/0026082 A1; US 2009/0127589 A1; US 2010/0137143 A1; or US 2010/0282617 A1, each of which is incorporated herein by reference in its entirety. Nucleic acids can be attached to a polymer sheet, substrate or other composition set forth herein for detection in such a system or method.

Another useful application for a composition of the present disclosure is, for example, part of gene expression analysis. Gene expression can be detected or quantified using RNA sequencing techniques, such as those, referred to as digital RNA sequencing. RNA sequencing techniques can be carried out using sequencing methodologies known in the art such as those set forth above. Gene expression can also be detected or quantified using hybridization techniques carried out by direct hybridization to a polymer sheet, substrate or other composition set forth herein or using a multiplex assay, the products of which are detected on a polymer sheet, substrate or other composition set forth herein. A composition of the present disclosure, for example, having been produced by a method set forth herein, can also be used to determine genotypes for a genomic DNA sample from one or more individual. Exemplary methods for array-based expression and genotyping analysis that can be carried out on an array of the present disclosure are described in U.S. Pat. Nos. 7,582,420; 6,890,741; 6,913,884 or 6,355,431 or U.S. Pat. Pub. Nos. 2005/0053980 A1; 2009/0186349 A1 or US 2005/0181440 A1, each of which is incorporated herein by reference in its entirety.

Determination of the nucleotide or nucleotides incorporated during each flow step for one or more of the polynucleotides attached to the polymer coating on the surface of the substrate present in the flow cell is achieved by detecting a signal produced at or near the polynucleotide template. In some embodiments of the above-described methods, the detectable signal comprises and optical signal. In other embodiments, the detectable signal comprises a non-optical signal. In such embodiments, the non-optical signal comprises a change in pH at or near one or more of the polynucleotide templates.

EXAMPLES

Additional embodiments are disclosed in further detail in the following examples, which are not in any way intended to limit the scope of the claims.

Example 1

General Experimental Procedure

Five different substrates were prepared. 2 FOTMS coated glass slides were prepared by CVD deposition of FOTMS in desiccator at 120° C. 2 CYTOP coated glass slides were prepared by dip coating of CYTOP followed by curing and wash. 2 pieces of PCB were cut out of a board. Substrates containing semi-hydrophobic surfaces including 5 tantalum oxide (TaO$_x$) PAZAM coated, primer grafted and FOTMS deposited dies and 5 silicon dioxide (SiO$_2$) PAZAM coated, primer grafted and FOTMS deposited dies were also provided.

After the slides were coated, the presence of the hydrophobic surface was confirmed using contact angle (CA) measurement, advancing contact angle (CAA), receding contact angle (CAR) and contact angle hysteresis (CAH). The contact angle measurements were performed on multiple locations on the coated glass slides and the data presented in the graphs represent the mean and standard variation of the measurements.

After the initial measurement (just after hydrophobic coating and before any type of treatment), the substrates were placed in contact with CMS at 60° C. for an extended period of time. The time of exposure depends on the type of substrates, but generally they were left to etch in CMS until quantifiable damage of the hydrophobic surface was detected. For example, a CYTOP surface needs to be exposed in CMS for 24-48 hours for the damage to be visible by contact angle, when a semi-hydrophobic surface is readily etched within a couple of hours.

The substrates were then removed from CMS rinsed with water, dried and re-measured by contact angle goniometry. The results of which were used to quantify the extent of the damage on the hydrophobic layer provoked by exposure to CMS.

The slides were then placed in a filler fluid at 60° C. for a few hours. Every experiment was run in duplicate, one substrate would be stored in the "legacy filler fluid" (PDMS/Span85) as negative control and the other substrates were then stored in the new "regenerative" formulation of filler fluid (i.e. PDMS containing either DMS-OH or FOTMS).

The different substrates were then cycled between the etchant and the different filler fluids back and forth and the evolution of the hydrophobic layer through time was evaluated after each exposure, using contact angle goniometry (static, advancing, receding and hysteresis).

Figure 5A:
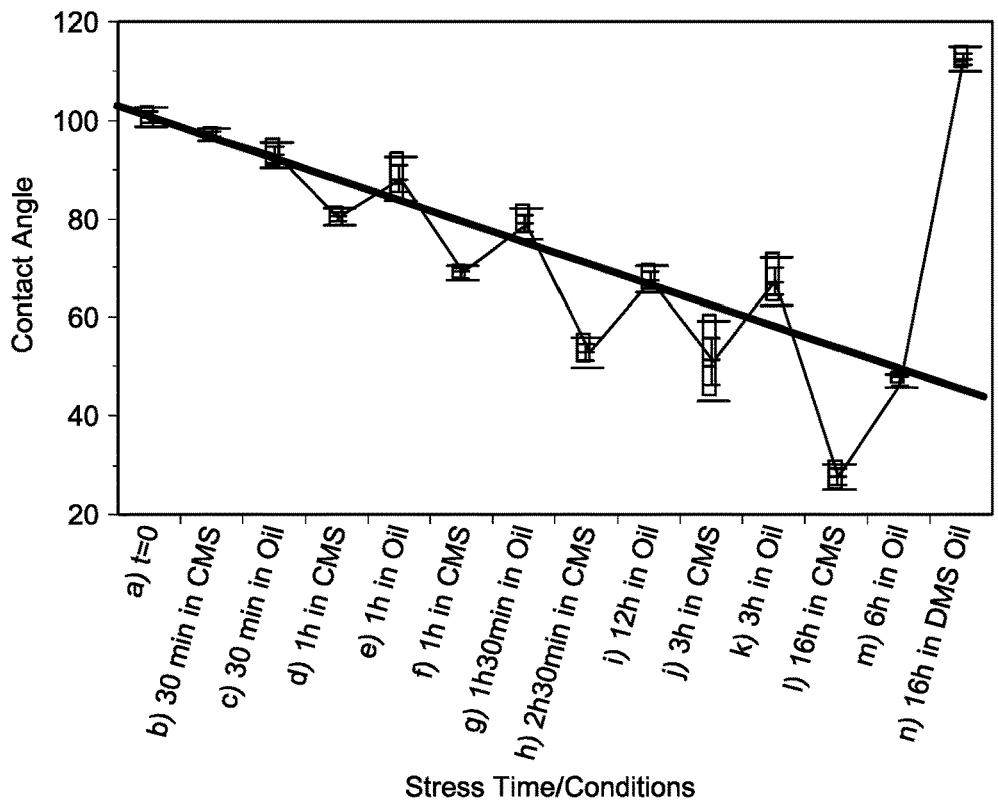
FIG. 5A is a line chart illustrating the change in contact angle of a hydrophobic compound (FOTMS) coated substrate surface as a function of stress time/conditions when a conventional filler fluid PDMS/Span85 is used.
Figure 5B:
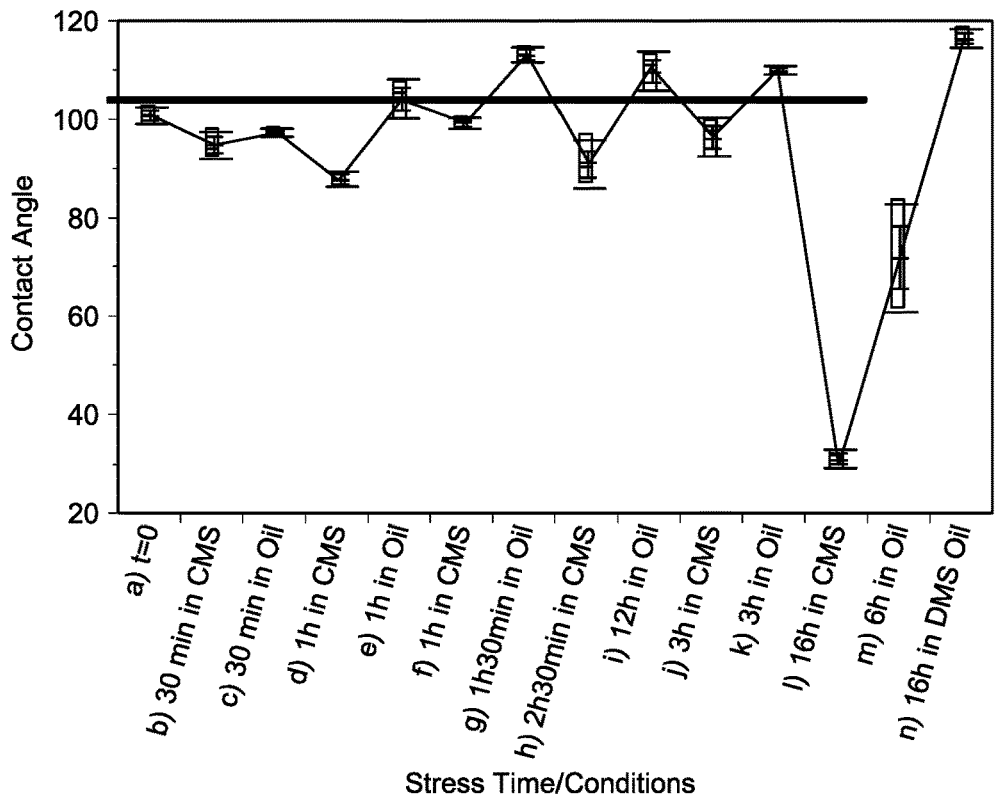
FIG. 5B is a line chart illustrating the change in contact angle of a hydrophobic compound (FOTMS) coated substrate surface as a function of stress time/conditions when the filler fluid PDMS contains a surface regenerative molecule DMS-OH is used.

Results and Discussion:

FIG. 5A illustrates the decrease in static contact angle of FOTMS coated glass substrate surface as a function of stress time/conditions with alternate exposure to CMS and filler fluid oil when the conventional filler fluid PDMS/Span85 was used. The FOTMS layer was deposited on the glass surface by Chemical Vapor Deposition (CVD). The initial contact angle was 105° and it dropped all the way to 50° after 8 h total exposure to CMS (FIG. 5A data point j). FIG. 5B illustrates the increase in contact angle of FOTMS coated SiO$_2$ substrate surface as a function of stress time/conditions with alternate exposure to CMS and filler fluid oil when the filler fluid PDMS contains a surface regenerative molecule DMS-OH was used. It was observed that regular exposure to the conventional filler fluid PDMS/Span85 does not change the constant decay of the hydrophobic surface and after 24 h in CMS the surface was totally etched away. The alternate exposure to the regenerative filler fluid PDMS/DMS-OH prevented the hydrophobic nature of the surface being depleted. After FOTMS was etched away by exposure to CMS, the hydroxyl function of the DMS-OH can react slowly react with the glass areas left vacant by forming a siloxane bond. At the end of the stress test, the hydrophobicity was fully restored after overnight exposition and even higher than at the beginning of the stress test (FIG. 5B data point n).

Figure 6A:
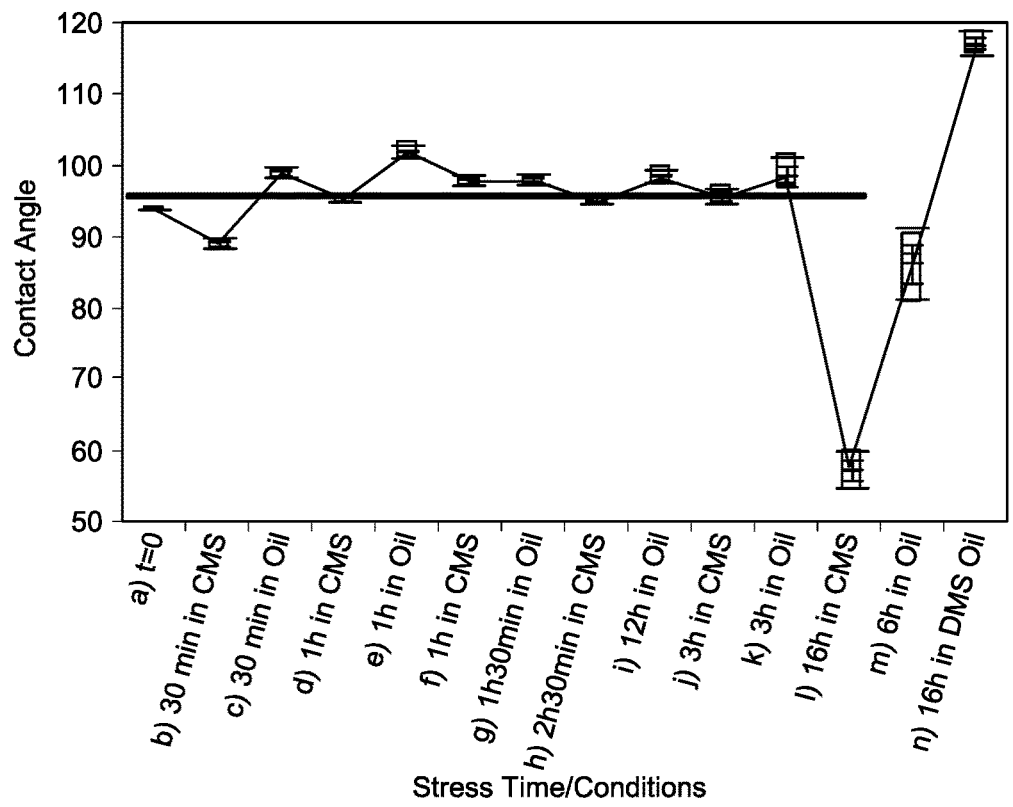
FIG. 6A is a line chart illustrating the change in contact angle of a hydrophobic compound (DMS) coated substrate surface as a function of stress time/conditions when a conventional filler fluid PDMS/Span85 is used.

FIG. 6A illustrates the change in contact angle of DMS coated substrate surface as a function of stress time/conditions with alternate exposure to CMS and filler fluid oil when the conventional filler fluid PDMS/Span85 was used. The non-covalent non-specific Van der Waals interaction between the filler fluid and the interstitial coating made the layer robust enough the survive CMS stress for extended period of time. The contacting angle remained the same no matter how long the substrate has been exposed to CMS.

Figure 6B:
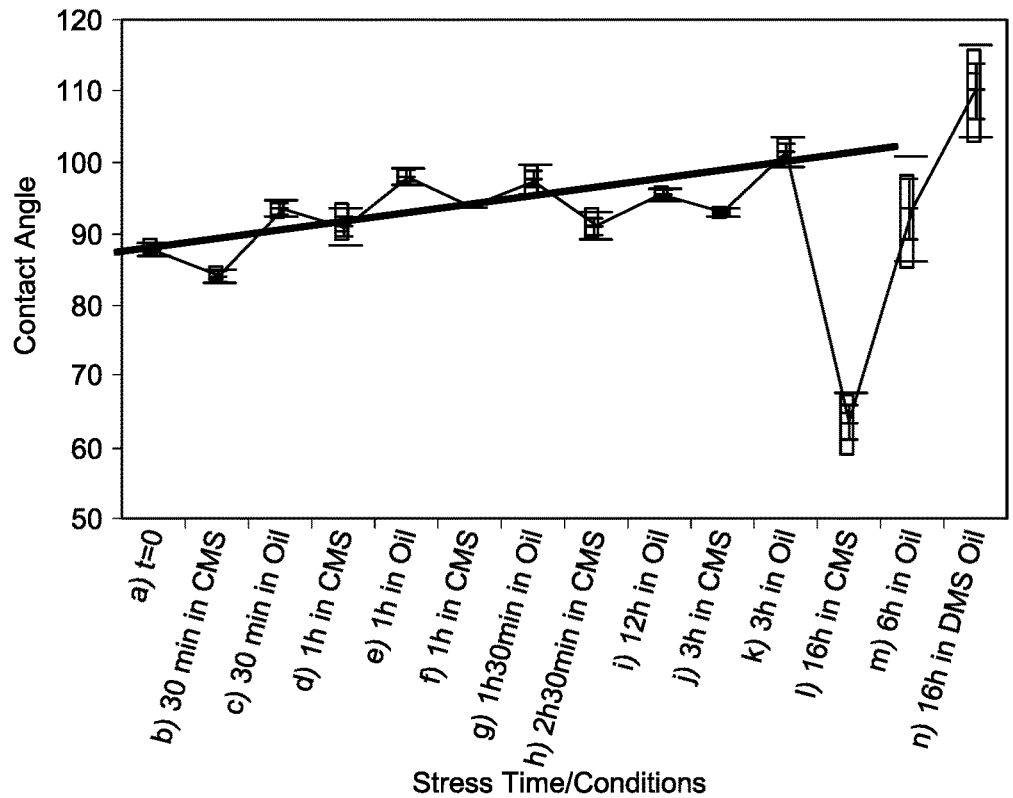
FIG. 6B is a line chart illustrating the change in contact angle of a hydrophobic compound (DMS) coated substrate surface as a function of stress time/conditions when the filler fluid PDMS contains a surface regenerative molecule DMS-OH is use.

FIG. 6B illustrates the change in contact angle of DMS coated substrate surface as a function of stress time/conditions with alternate exposure to CMS and filler fluid oil when the filler fluid PDMS contains a surface regenerative molecule DMS-OH was used.

Figure 7A:
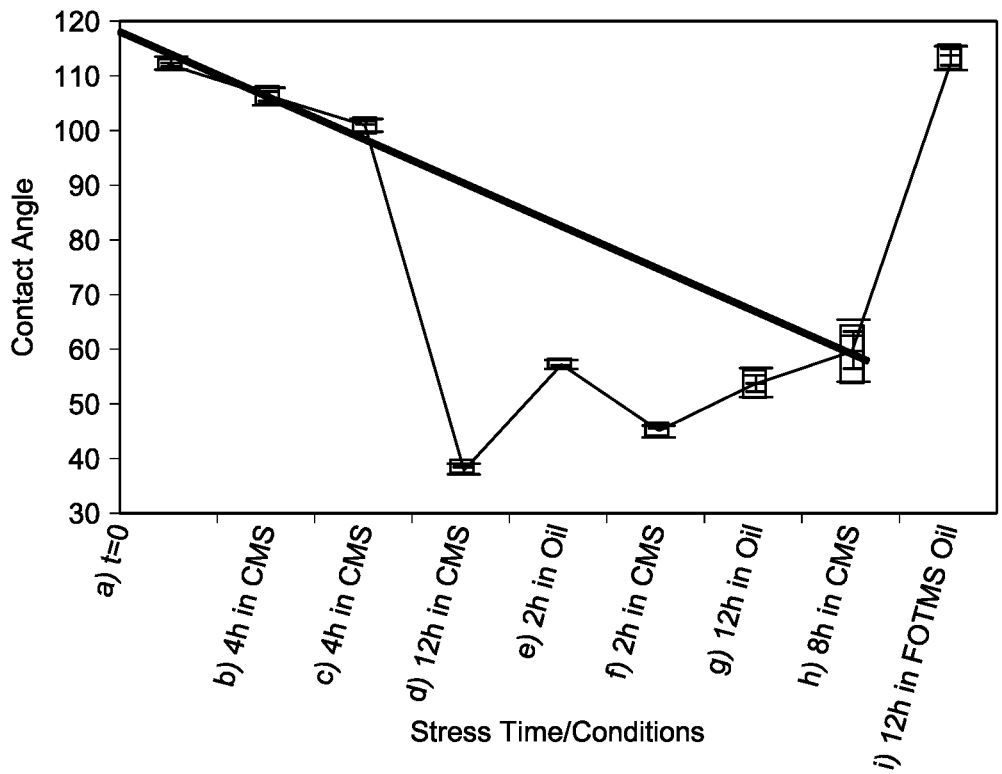
FIG. 7A is a line chart illustrating the change in contact angle of a hydrophobic surface of a printed circuit board (PCB) as a function of stress time/conditions when a conventional filler fluid PDMS/Span85 is used.

FIG. 7A illustrates the change in contact angle of a hydrophobic surface of a printed circuit board (PCB) as a function of stress time/conditions with alternate exposure to CMS and filler fluid oil when the conventional filler fluid PDMS/Span85 was used. At the end of the stress test, the hydrophobicity was fully restored after overnight exposure in PDMS/FOTMS filler oil (FIG. 7A data point i).

Figure 7B:
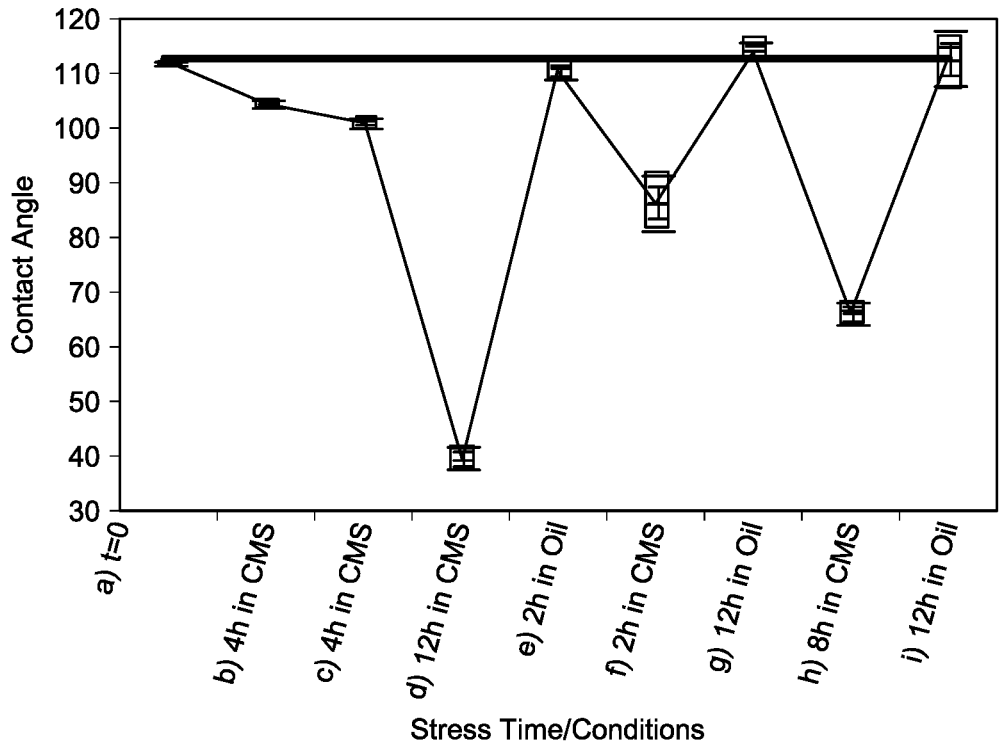
FIG. 7B is a line chart illustrating the change in contact angle of a hydrophobic surface of a printed circuit board (PCB) as a function of stress time/conditions when filler fluid PDMS containing a surface regenerative molecule FOTMS is used.

FIG. 7B illustrates the change in contact angle of a hydrophobic surface of a printed circuit board (PCB) as a function of stress time/conditions with alternate exposure to CMS and filler fluid oil when filler fluid PDMS containing a surface regenerative molecule FOTMS was used. At the end of the stress test, the hydrophobicity was fully restored after 12 h exposure in PDMS/FOTMS filler oil (FIG. 7B data point i). Similar experiments were conducted using the siloxane polymer with fluorinated side chains as the surface regenerative molecule and similar results were observed.

Figure 8A:
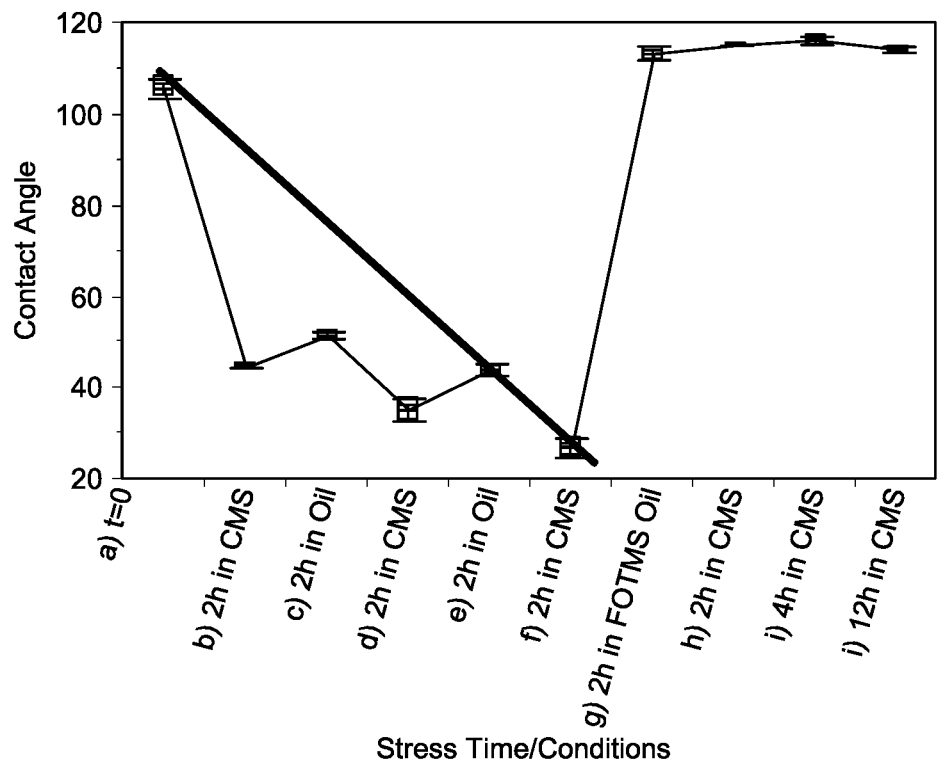
FIG. 8A is a line chart illustrating the change in contact angle of a hydrophobic compound FOTMS coated substrate surface as a function of stress time/conditions when a conventional filler fluid PDMS/Span85 is used.

In this next experiment, the change in hydrophobicity of FOTMS coated substrate in filler fluid PDMS/Span85 was compared to that of FOTMS coated substrate in PDMS/FOTMS filler fluid. FIG. 8A illustrates the change in contact angle of FOTMS coated substrate surface as a function of stress time/conditions with alternate exposure to CMS and filler fluid oil when the conventional filler fluid PDMS/Span85 was used. Continuous decreases in contact angle were observed after exposure to CMS, which was not countered by exposure to PDMS/Span85 (FIG. 8A data point f). After exposure in PDMS/FOTMS filler fluid for 2 hours, the restoration of the contact angle was observed. Additional stress test with CMS did not seem to change the contact angle due to the formation of multiple hydrophobic layers of FOTMS on the substrate surface.

Figure 8B:
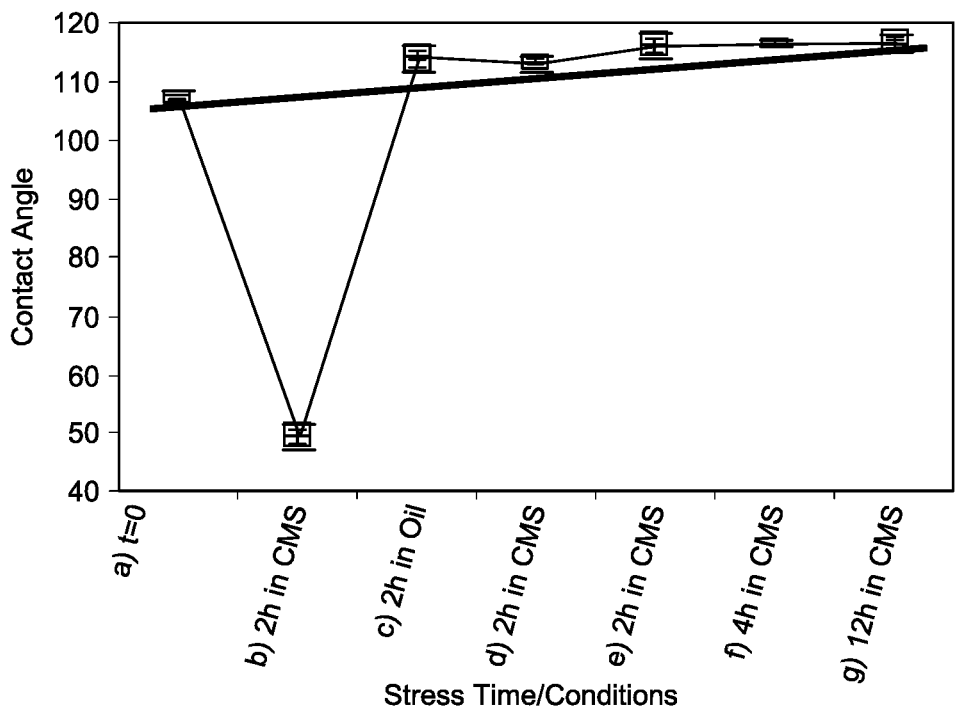
FIG. 8B is a line chart illustrating the change in contact angle of a hydrophobic compound FOTMS coated substrate surface as a function of stress time/conditions when filler fluid PDMS containing a surface regenerative molecule FOTMS is used.

FIG. 8B illustrates the change in contact angle of FOTMS coated substrate surface as a function of stress time/conditions with alternate exposure to CMS and filler fluid when filler fluid PDMS containing a surface regenerative molecule FOTMS was used. It was observed that the loss in hydrophobicity after exposure to CMS for 2 hours was effectively countered by the exposure to the regenerative filler fluid (FIG. 8B data point c). Due to the fact that the methoxy-silane moiety of FOTMS is more reactive to the glass surface than the hydroxyl-silane terminal group of DMS-OH, the regenerated coating from PDMS/FOTMS was much more stable than the regenerated coating obtained from PDMS/DMS-OH. It was also surprisingly found that the regenerated hydrophobic surface was more stable than the original coating obtained by chemical vapor deposition (CVD). In FIG. 8A, the original hydrophobic coating was etched away after 2 h exposure to CMS, while in FIG. 8B the regenerated hydrophobic coating remained stable for 20 h in the same CMS etching conditions.

Figure 9A:
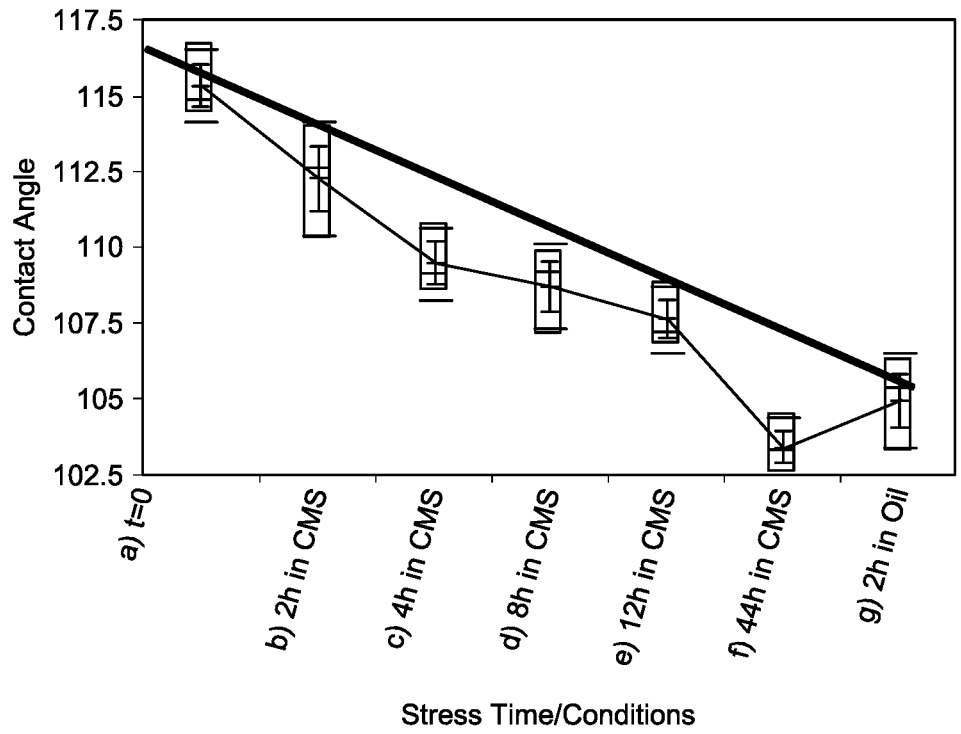
FIG. 9A is a line chart illustrating the change in contact angle of a hydrophobic compound CYTOP coated substrate surface as a function of stress time/conditions when a conventional filler fluid PDMS/Span85 is used.
Figure 9B:
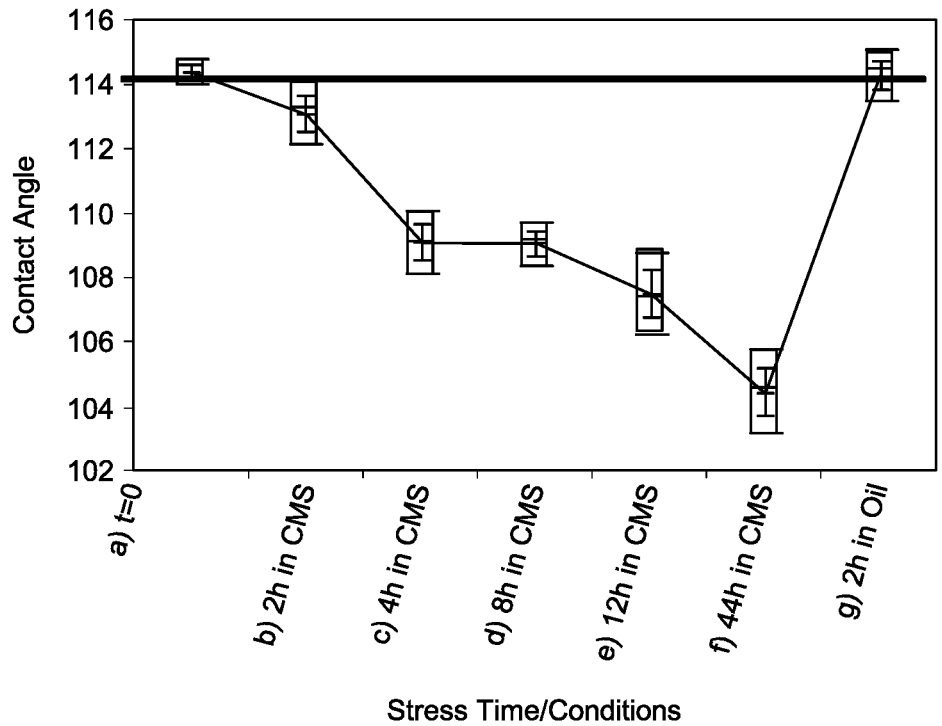
FIG. 9B is a line chart illustrating the change in contact angle of a hydrophobic compound CYTOP coated substrate surface as a function of stress time/conditions when filler fluid PDMS containing a surface regenerative molecule FOTMS is used.

Similarly, the change in hydrophobicity of CYTOP coated PCB in filler fluid PDMS/Span85 was compared to that of CYTOP coated PCB in PDMS/FOTMS filler fluid. The PCB sections were dipped into CMS for etching but a much longer etching time was needed as CYTOP is more robust to high pH than silane monolayers. The purpose of this experiment is to determine whether FOTMS in the filler fluid can interact with the CYTOP layer to regenerate it. In this approach, van der Waals interactions are expected to be the driving force (as opposed to covalent bond formation between the active molecule and the glass in the examples cited above). Again, the exposure to regenerative filler fluid PDMS/FOTMS (FIG. 9B) prevented the constant decay of the hydrophobic nature of the surface when the PCB section was exposed to CMS as compared to filler fluid PDMS/Span85 (FIG. 9A).

Figure 10A:
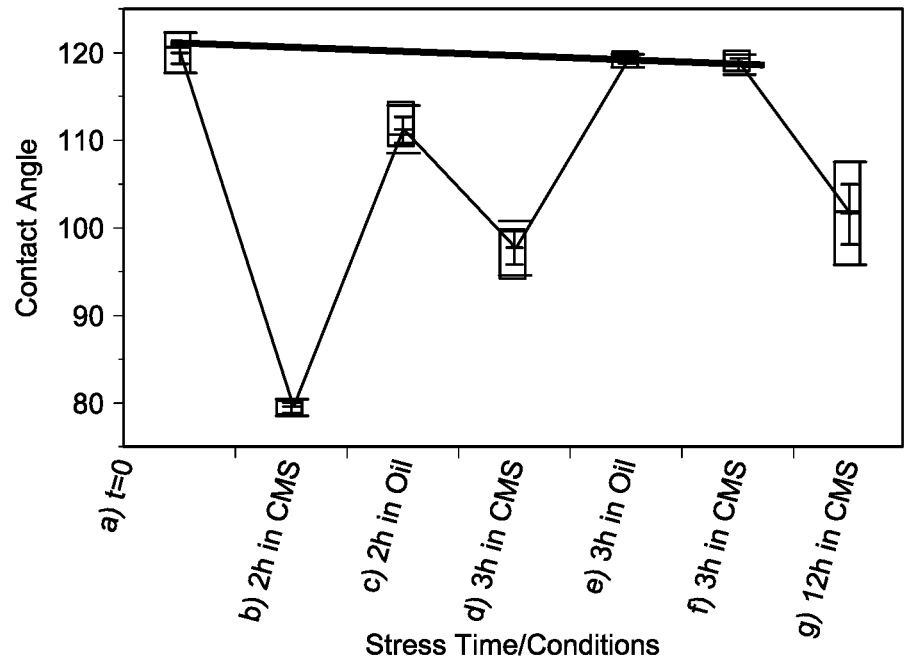
FIG. 10A is a line chart illustrating the change in contact angle of a tantalum oxide die surface as a function of stress time/conditions when filler fluid PDMS containing a surface regenerative molecule FOTMS is used.
Figure 10B:
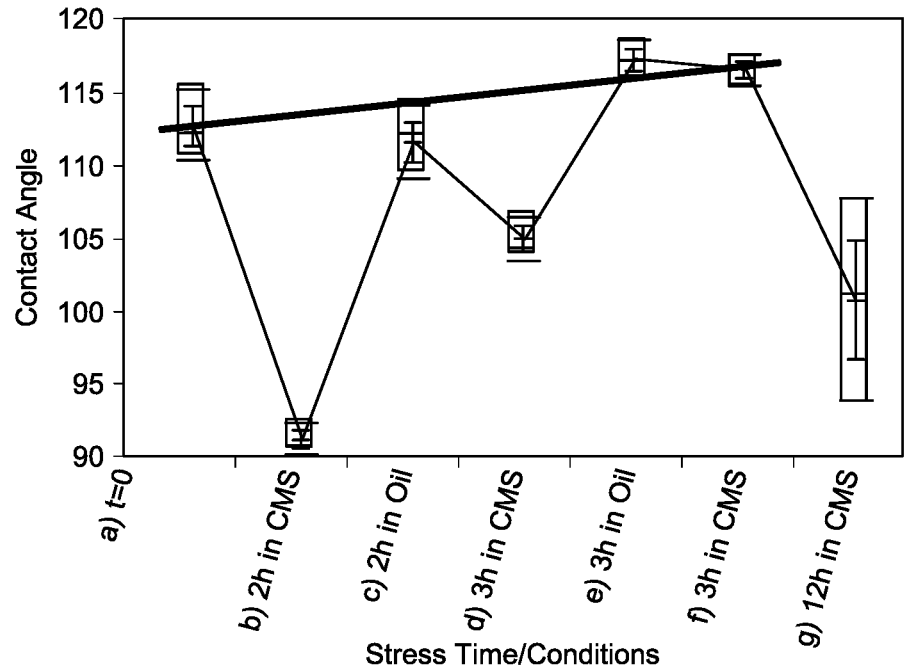
FIG. 10B is a line chart illustrating the change in contact angle of a silicon dioxide die surface as a function of stress time/conditions when filler fluid PDMS containing a surface regenerative molecule FOTMS is used.

Next, the regenerative ability of filler fluid PDMS/FOTMS was tested with tantalum oxide ($TaO_x$) and silicon dioxide ($SiO_2$) die surfaces as illustrated in FIGS. 10A and 10B respectively. Both $TaO_x$ and $SiO_2$ die surfaces are semi-hydrophobic, containing a hydrophilic sequencing area and a hydrophobic interstitial area. No negative control experiments were performed. The stress test condition shown in FIGS. 10A and 10B is close to the actual conditions used in a digital fluidic cartridge for SBS chemistry. In each case, the hydrophobicity of the surface was readily restored when exposed to the regenerative filler fluid PDMS/FOTMS, but is constantly decaying when exposed to PDMS/Span85. The best stability observed for this type of substrates was a drop of 20% of the hydrophobicity after 4 h exposure to CMS at 60° C. (data not shown).

In conclusion, the experimental data suggests that adding a surface regenerative hydrophobic molecule to the filler fluid results in the regeneration of the hydrophobicity of the surface. These surfaces can be surface of a glass substrate or the hydrophobic coating of a printed circuit board, either patterned or continuous. This surface regeneration approach can be easily extended to the fabrication of closed digital fluidic systems dedicated for SBS sequencing. These systems will have the ability to self-heal the hydrophobic layers during sequencing runs in the period of time when the surfaces are in contact with the regenerative filler fluid. It is also envisioned that this approach can be applied to any type of digital fluidic or electrowetting system with hydrophobic coatings.

Example 2

Figure 11:
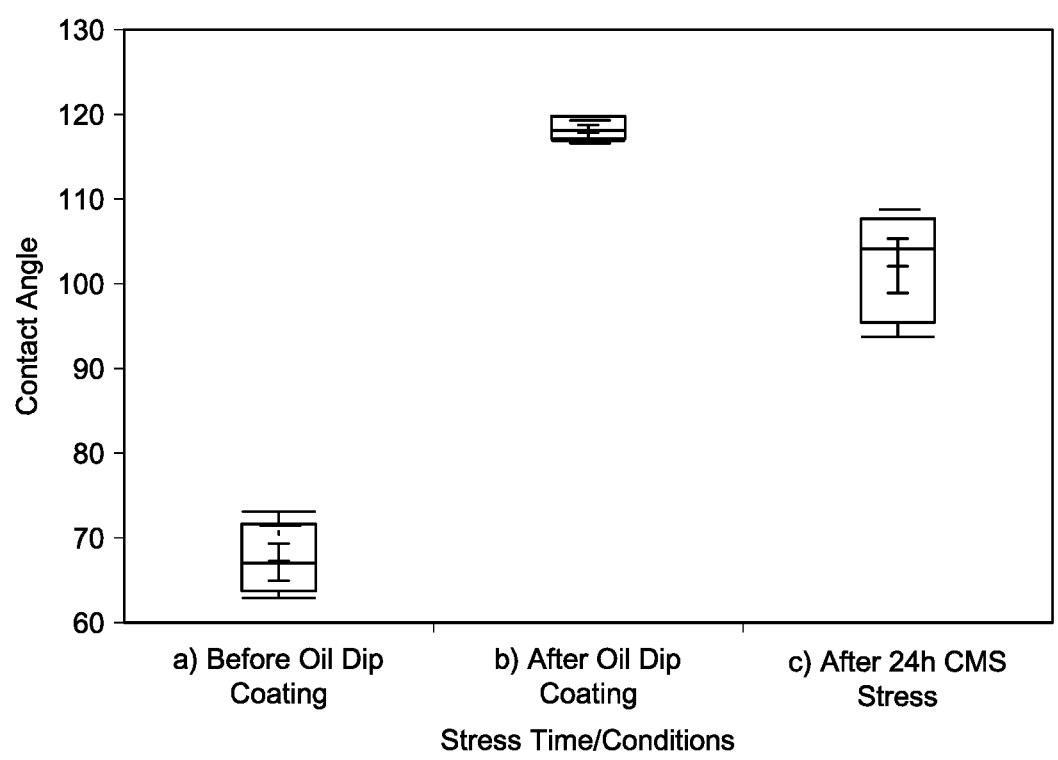
FIG. 11 illustrates the contact angle measurements of patterned glass slides in various conditions.

In this experiment, an alternative method of coating a die was explored. Using the technique described in Example 1, a mixture of FOTMS in PDMS makes it possible to dip coat glass surface. FIG. 11 shows the contact angle measurements of patterned glass slides: a) before dip coating in PDMS/FOTMS oil, b) after 3 h exposure to the mixture PDMS/FOTMS and c) after 24 h stress in CMS. The silane layer thus obtained demonstrates a much better resistance to hydrolysis than the silane layer obtained by chemical vapor deposition (compared to FIG. 8B). The technique of dip coating in certain silicon oil presents some benefits compared to the traditional dip coating in organic solvent, for example, the low vapor pressure of PDMS and its high boiling point prevents evaporation of the mix during the process. This results in a much better control over the concentration through time. Lastly, due to the hydrophobic nature of the silicon oil, the substrates will be protected from moisture throughout the deposition.

Example 3

In this example, a digital cartridge stress test was conducted to determine whether electrowetting induced THP degradation may be reduced by the presence of a surface regenerative molecule in the filler fluid. The electrowetting generally involves combining the chemical species necessary to form reaction/sample droplets and transporting and/or incubating the droplets within certain reaction zones of a droplet actuator. During this process, electric current may leak through cartridge surface and generate reactive molecular species (such as reactive oxygen species (ROS) and/or hypochlorite), which may cause physical damage to device electrodes and dielectrics of the fluidic cartridge. These reactive molecular species may also damage biochemical reaction components, such as nucleic acids (e.g., DNA), enzymes, and reagents that are placed within the digital microfluidics device.

Reactive molecular species (e.g., ROS and/or hypochlorite) generated during electrowetting may react with various reagents used in a biochemical reaction. For example, tris(-3hydroxypropyl)phosphine (THP) is a reducing agent frequently used in biochemistry and molecular biology applications, such as an SBS reaction. THP is an electro-sensitive molecule that can be dissolved in the aqueous droplets. When electric charges leak from the cartridge to the droplets, it generates reactive molecular species and causes THP to degrade. Therefore, THP may be used as an indicator to monitor the leaching of the electric charges. In the presence of ROS or hypochlorite, THP may be oxidized and lose activity over time. The THP assay measures the permeability of the cartridge surface by using Ellman's reagent (5'-dithiobis-(2-nitrobenzoic acid) or DTNB) to detect unreacted THP after electrowetting in an aqueous droplet. THP reacts with DTNB in a 1:1 ratio to generate 1 molecule of oxidized THP and 2 equivalents of 2-nitro-5-thiobenzoate (TNB). The amount of TNB in a droplet is determined by measuring the absorbance of the droplet solution at 412 nm and the concentration calculating from the molar extinction coefficient of TNB (E=14150 $M^{-1}$ $cm^{-1}$ at 412 nm). The amount of TNB in the droplet solution is used to calculate the amount of reduced THP in the droplet solution.

Stress test condition: 12 DU, room temperature or 60° C., 30 Hz switching frequency, 5 sec transport rate, 300 V, 30 cycles (1 h). THP solution composition: 2 mM THP, 0.2 mM Ascorbate, 5 mM Tris-HCl pH 7.5, 1 M NaCl, 0.5 mM EDTA, 0.01% Tween-20. THP loss was measured sequentially with Ellman's reagent post electrowetting.

Figure 12:
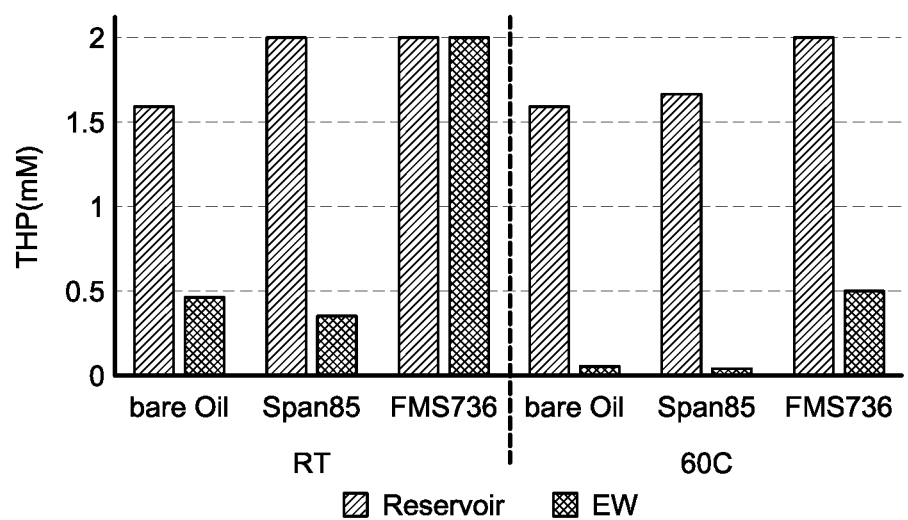
FIG. 12 is a bar chart illustrating the electrowetting induced tris(-3hydroxypropyl)phosphine (THP) degradation in a droplet pathway at room temperature and 60° C., comparing the neat filler fluid PDMS with a conventional filler fluid PDMS/Span85 and a filler fluid PDMS containing a surface regenerative molecule FMS 736.

Electrowetting was conducted with degassed commercial filler fluid bare oil (5 cSt PDMS), degassed 5 cSt PDMS with 0.0025% w/w Span85, and degassed PDMS with 1% w/w FMS 736 at both room temperature and 60° C. THP degradation was measured in the droplet after it was moved along the droplet pathway in the cartridge using electrowetting forces and the results are illustrated in FIG. 12. It was observed that at both temperatures, a filler fluid without any surface regenerative molecule (i.e., bare oil) resulted in most THP degradation. PDMS/Span 85 reduced the THP degradation to some degree in the droplet reservoir but did not show any improvement in droplets after electrowetting. In contrast, PDMS/FMS736 substantially reduced or entirely eliminated the THP degradation both in droplet reservoir and droplets after electrowetting. Although increasing temperature decrease the efficiency of FMS 736, it still showed drastic improvement as compared to the other two filler fluid.

Figure 13A:
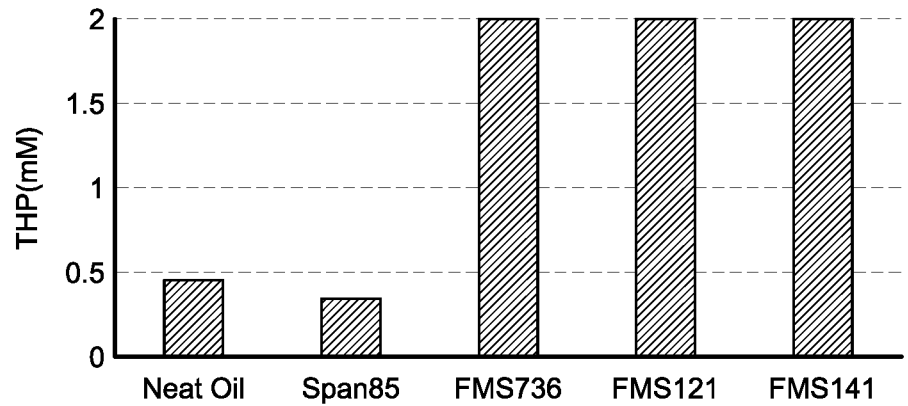
FIG. 13A is a bar chart illustrating the electrowetting induced THP degradation at 25° C., comparing a neat filler fluid PDMS with filler fluids containing various surface regenerative molecules.
Figure 13B:
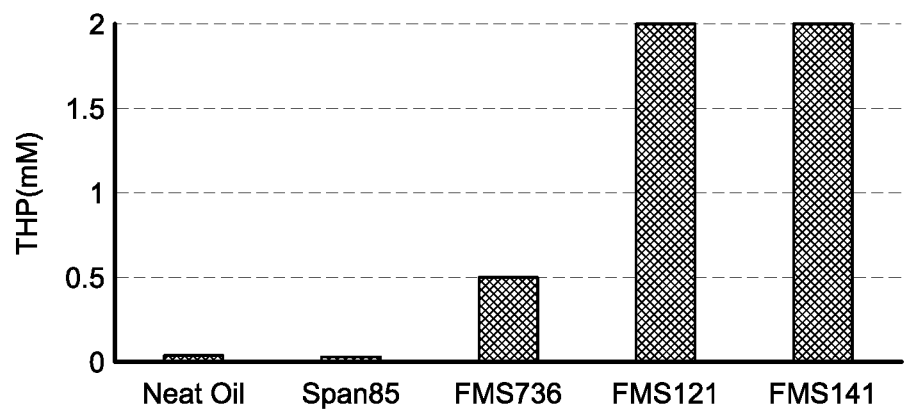
FIG. 13B is a bar chart illustrating the electrowetting induced THP degradation at 60° C., comparing a neat filler fluid PDMS with filler fluids containing various surface regenerative molecules.

In a separate experiment, a similar THP assay was conducted with five different filler fluid: degassed commercial filler fluid bare oil (5 cSt PDMS), degassed PDMS with 0.0025% w/w Span85, degassed PDMS with 1% w/w FMS 736, degassed PDMS with 1% w/w FMS 121, and degassed PDMS with 1% w/w FMS 141, at both 25° C. and 60° C. and the results are shown in FIGS. 13A and 13B respectively. Again, surface regenerative molecules FMS 736, FMS 121 and FMS 141 demonstrated substantially reduced or entirely eliminated the THP degradation at 25° C. Although the efficiency of FMS 736 decreased at elevated temperature, it was surprisingly found that the elevated temperature did not impact the effectiveness of FMS 121 and FMS 141.

What is claimed is:

1. A method, comprising:
mixing a surface regenerative molecule comprising a silane derivative with a filler fluid before the start of a droplet operation or adding the surface regenerative molecule to the filler fluid during the droplet operation;
contacting a hydrophobic surface of a droplet actuator of a microfluidic device with the filler fluid comprising the surface regenerative molecule at least during the droplet operation, wherein the contacting regenerates hydrophobicity of the hydrophobic surface.

2. The method of claim 1, wherein the microfluidic device comprises a patterned sequencing region, said patterned sequencing region comprising both a hydrophilic surface area and a hydrophobic surface area.

3. The method of claim 2, wherein the sequencing region comprises poly(N-(5-azidoacetamidylpentyl) acrylamide-co-acrylamide) (PAZAM).

4. The method of claim 1, wherein the surface regenerative molecule further comprises a fluorinated silane derivative, a fluorinated siloxane polymer, a hydrocarbon, a halogenated hydrocarbon, or combinations thereof.

5. The method of claim 4, wherein the fluorinated silane derivative comprises FOTMS, FOS-X, or hydroxy terminated trifluorooctyl silane (HOTS), a siloxane with fluorinated side chains, or a combination thereof.

6. The method of claim 5, wherein the siloxane with fluorinated side chains comprises SIB1816.

7. The method of claim 4, wherein the fluorinated siloxane polymer comprises a polymer of Formula (Ia):

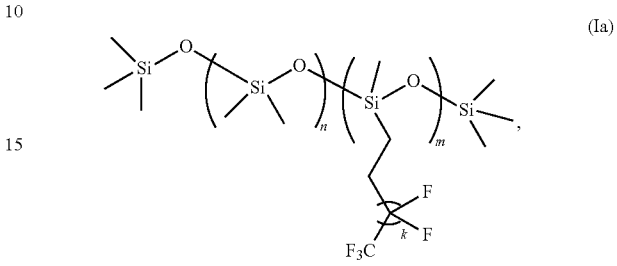

(Ia)

wherein each m and n is an integer independently selected from 1 to 1000, and k is an integer selected from 0 to 100.

8. The method of claim 7, wherein the fluorinated siloxane polymer comprises FMS 736, FMS 121, FMS 141, or combinations thereof.

9. The method of claim 1, wherein the surface regenerative molecule is about 0.0025% w/w to about 1.0% w/w of the filler fluid.

10. The method of claim 1, wherein the hydrophobicity of the hydrophobic surface of the microfluidic device is regenerated by covalent linking the surface regenerative molecule to the hydrophobic surface.

11. The method of claim 1, wherein the filler fluid of the microfluidic device further comprises polydimethylsiloxane (PDMS).

12. The method of claim 1, wherein the silane derivative comprises dimethylsiloxane (DMS) or hydroxy dimethylsiloxane (DMS-OH).

* * * * *

UNITED STATES PATENT AND TRADEMARK OFFICE
CERTIFICATE OF CORRECTION

| | | |
|---|---|---|
| PATENT NO. | : 10,906,044 B2 | Page 1 of 1 |
| APPLICATION NO. | : 15/746390 | |
| DATED | : February 2, 2021 | |
| INVENTOR(S) | : Xavier von Hatten | |

It is certified that error appears in the above-identified patent and that said Letters Patent is hereby corrected as shown below:

In the Specification

In Column 1, Line 10, delete "Apr. 11, 2013" and insert -- Aug. 31, 2016 --, therefor.

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*